United States Patent
Kwon et al.

(10) Patent No.: US 12,160,125 B2
(45) Date of Patent: Dec. 3, 2024

(54) CHARGING INTEGRATED CIRCUIT FOR CHARGING BATTERY DEVICE AND ELECTRONIC DEVICE INCLUDING THE SAME

(71) Applicant: SAMSUNG ELECTRONICS CO., LTD., Suwon-si (KR)

(72) Inventors: Minkyu Kwon, Hwaseong-si (KR); Sungkyu Cho, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 784 days.

(21) Appl. No.: 17/389,791

(22) Filed: Jul. 30, 2021

(65) Prior Publication Data
US 2022/0140621 A1   May 5, 2022

(30) Foreign Application Priority Data

Oct. 30, 2020 (KR) .................... 10-2020-0143869

(51) Int. Cl.
*H02J 7/00* (2006.01)

(52) U.S. Cl.
CPC .......... *H02J 7/0019* (2013.01); *H02J 7/0018* (2013.01); *H02J 7/0024* (2013.01); *H02J 7/0047* (2013.01); *H02J 7/00711* (2020.01); *H02J 7/00714* (2020.01); *H02J 7/007182* (2020.01); *H02J 7/007194* (2020.01)

(58) Field of Classification Search
USPC ................. 320/115, 116, 117, 118, 119, 120
See application file for complete search history.

(56) References Cited

U.S. PATENT DOCUMENTS

| | | | |
|---|---|---|---|
| 7,511,457 B2 | 3/2009 | Emori et al. | |
| 8,405,349 B2* | 3/2013 | Kikinis | H02J 7/0016 320/117 |
| 10,427,547 B2 | 10/2019 | Syouda | |
| 10,500,980 B2 | 12/2019 | Conlon et al. | |
| 2010/0194343 A1* | 8/2010 | Sano | H02J 7/0016 320/118 |
| 2011/0001456 A1 | 1/2011 | Wang | |
| 2016/0006377 A1* | 1/2016 | Hashimoto | B60L 58/20 290/31 |
| 2016/0285287 A1* | 9/2016 | Cha | H02J 7/0048 |

(Continued)

FOREIGN PATENT DOCUMENTS

| | | |
|---|---|---|
| CN | 110875616 A | 3/2020 |
| KR | 10-2035682 B1 | 10/2019 |

*Primary Examiner* — Brian Ngo
(74) *Attorney, Agent, or Firm* — Muir Patent Law, PLLC

(57) ABSTRACT

A charging integrated circuit (IC) includes: a connection circuit configured to selectively connect a first battery and a second battery to each other in series and in parallel; a first charger configured to charge the first battery and the second battery connected to each other in parallel in a first charging mode; and a second charger configured to charge the first battery and the second battery connected to each other in series in a second charging mode. The connection circuit may include: a first regulating circuit connected to the first battery in series and configured to regulate a first balancing current flowing to the first battery; and a second regulating circuit connected to the second battery in series and configured to regulate a second balancing current flowing to the second battery.

20 Claims, 33 Drawing Sheets

(56) References Cited

U.S. PATENT DOCUMENTS

| | | |
|---|---|---|
| 2020/0070667 A1 | 3/2020 | Wang et al. |
| 2020/0127467 A1 | 4/2020 | Li |
| 2020/0144829 A1 | 5/2020 | Lee et al. |
| 2021/0078429 A1* | 3/2021 | Li .......................... B60L 58/21 |
| 2021/0159709 A1* | 5/2021 | Kim .................. H02J 7/007182 |

* cited by examiner

CHARGING INTEGRATED CIRCUIT FOR CHARGING BATTERY DEVICE AND ELECTRONIC DEVICE INCLUDING THE SAME

CROSS-REFERENCE TO RELATED APPLICATION

Korean Patent Application No. 10-2020-0143869, filed on Oct. 30, 2020, in the Korean Intellectual Property Office, and entitled: "Charging Integrated Circuit for Charging Battery Device and Electronic Device Including the Same," is incorporated by reference herein in its entirety.

BACKGROUND

1. Field

Embodiments relate to a charger, and more particularly, to a charging integrated circuit (IC) for charging a battery device and an electronic device including the charging IC.

2. Description of the Related Art

A portable electronic device like a mobile phone typically includes a battery. As next-generation communication technology continues to evolve, power used for data processing in a mobile phone is increasing. Increases in battery capacity and quick charging of a battery may reduce restrictions on a use time of a mobile phone.

SUMMARY

Embodiments are directed to a charging integrated circuit (IC) for charging a battery device that includes a first battery and a second battery, the charging IC including: a connection circuit configured to selectively connect the first battery and the second battery to each other in series and in parallel; a first charger configured to charge the first battery and the second battery connected to each other in parallel in a first charging mode; and a second charger configured to charge the first battery and the second battery connected to each other in series in a second charging mode. The connection circuit may include: a first regulating circuit connected to the first battery in series and configured to regulate a first balancing current flowing to the first battery; and a second regulating circuit connected to the second battery in series and configured to regulate a second balancing current flowing to the second battery.

Embodiments are also directed to a charging integrated circuit (IC) for charging a first battery and a second battery, the charging IC including: a switching charger configured to charge the first battery and the second battery using a first charge input received from a first input terminal in a normal charging mode; a direct charger configured to charge the first battery and the second battery using a second charge input received from a second input terminal in a quick charging mode; and a connection circuit configured to connect the first battery and the second battery to each other in series or in parallel, the connection circuit including: a first switching element and a second switching element configured to connect the first battery and the second battery to each other in series or in parallel; a first regulating circuit configured to regulate a first balancing current flowing to the first battery; and a second regulating circuit configured to regulate a second balancing current flowing to the second battery.

Embodiments are also directed to an electronic device, including: a charging integrated circuit (IC) configured to charge a battery device including a first battery and a second battery; and a system load configured to receive power from the charging IC, wherein the charging integrated circuit includes a connection circuit configured to connect the first battery and the second battery to each other in series or in parallel; a first charger connected to the system load and configured to charge the first battery and the second battery connected to each other in parallel in a first charging mode through a first charging path; and a second charger configured to charge the first battery and the second battery connected to each other in series in a second charging mode through a second charging path, and the connection circuit includes a first regulating circuit configured to regulate a first balancing current flowing to the first battery; and a second regulating circuit configured to regulate a second balancing current flowing to the second battery.

Embodiments are also directed to an integrated circuit (IC) for charging a first battery and a second battery, the IC including: a connection circuit configured to connect the first battery and the second battery to each other in parallel in a first charging mode, and connect the first battery and the second battery to each other in series in a second charging mode, the connection circuit including: a first regulating circuit connected to the first battery in series and configured to regulate a first balancing current flowing to the first battery; and a second regulating circuit connected to the second battery in series and configured to regulate a second balancing current flowing to the second battery.

BRIEF DESCRIPTION OF THE DRAWINGS

Features will become apparent to those of skill in the art by describing in detail example embodiments with reference to the attached drawings in which.

DETAILED DESCRIPTION

Figure 1:
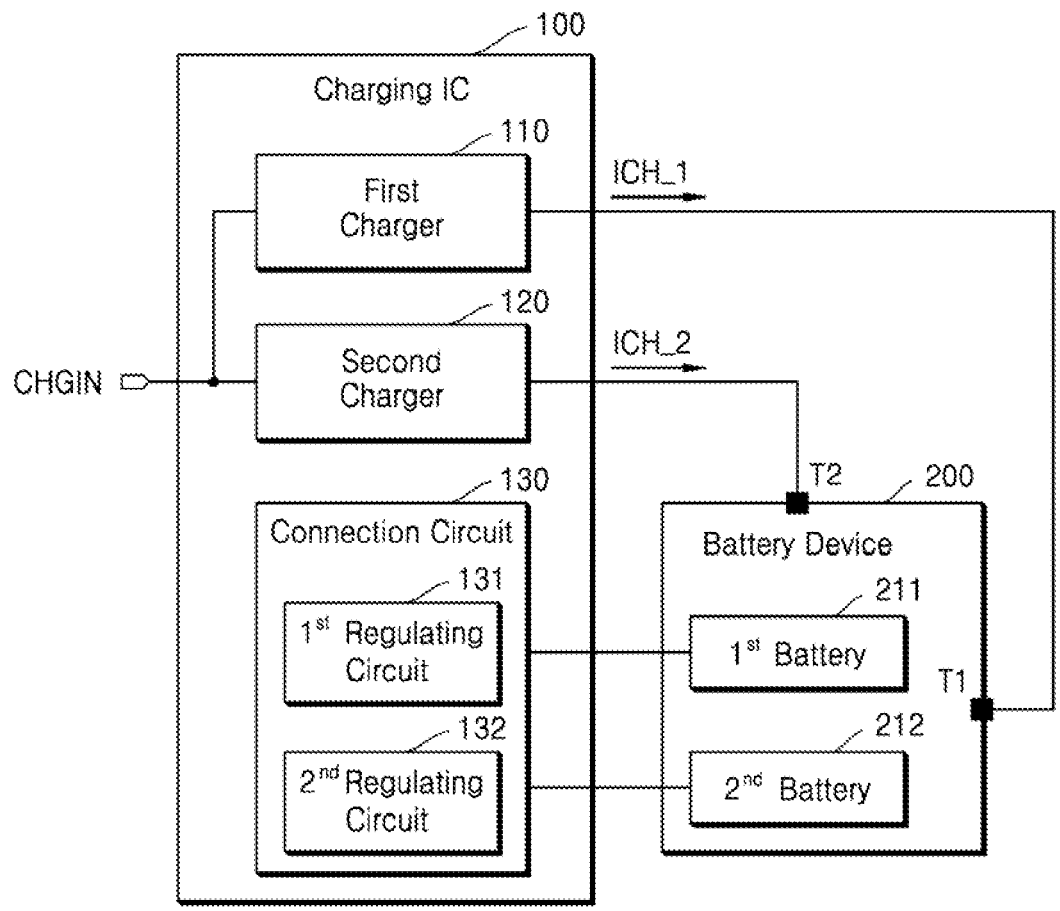
FIG. 1 is a block diagram schematically showing an electronic device according to an example embodiment.

FIG. 1 is a block diagram schematically showing an electronic device 10 according to an example embodiment.

Referring to FIG. 1, the electronic device 10 may include a charging integrated circuit (IC) 100, and the charging IC 100 may be referred to as a "battery charger". In an example embodiment, the charging IC 100 may be implemented as an IC chip and may be mounted on a printed circuit board. In an example embodiment, the electronic device 10 may be a mobile device like a smartphone, a tablet personal computer (PC), a mobile phone, a personal digital assistant (PDA), a laptop computer, a wearable device, a global positional system (GPS) device, an E-book terminal, a digital broadcasting terminal, an MP3 player, a digital camera, etc. Furthermore, the electronic device 10 may be a device that performs Internet of Things or a device included in an electric vehicle.

The electronic device 10 may include a battery device 200. In an example embodiment, the battery device 200 may be embedded in the electronic device 10. In an example embodiment, the battery device 200 may be detachably attached to the electronic device 10. The battery device 200 may include a first battery 211 and a second battery 212. The battery device 200 may include a first terminal T1 and a second terminal T2 through which currents for charging are supplied. In an example embodiment, the battery device 200 may include three or more batteries. The first terminal T1 may be configured to receive a first charging current ICH_1 for charging a first battery 211 and a second battery 212 connected in parallel in a first charging mode to be described below. The second terminal T2 may be configured to receive a second charging current ICH_2 for charging the first battery 211 and the second battery 212 connected in series in a second charging mode to be described below. The second terminal T2 in the second charging mode may be supplied with a higher voltage than the first terminal T1 in the first charging mode, and thus, the second terminal T2 may also be referred to as a high voltage terminal.

In an example embodiment, the first battery 211 may be a first battery cell, and the second battery 212 may be a second battery cell. In an example embodiment, the first battery 211 may be a first battery pack, and the second battery 212 may be a second battery pack. In an example embodiment, at least one of the first battery pack and the second battery pack may be a multi-cell battery including a plurality of battery cells. In an example embodiment, at least one of the first battery pack and the second battery pack may be a single-cell battery including one battery cell.

The charging IC 100 may include a first charger 110, a second charger 120, and a connection circuit 130. The charging IC 100 may operate in one of the first charging mode and the second charging mode to charge the battery device 200 and, in a battery-only mode (or a discharging mode), may provide power (or a system voltage or a system current) to a system load SL (not shown in FIG. 1; see, e.g., FIG. 2) using the battery device 200. In an example embodiment, the first charger 110, the second charger 120, and the connection circuit 130 may be implemented as one IC. However, example embodiments are not limited thereto, and, in an example embodiment, at least one of the first charger 110, the second charger 120, and the connection circuit 130 may be implemented as separate ICs. In an example embodiment, the first charger 110 and the second charger 120 may be implemented as a first IC, and the connection circuit 130 may be implemented as a second IC. Furthermore, the connection circuit 130 may be implemented as a single chip together with the battery device 200, or only the connection circuit 130 may be independently implemented as a single chip.

The charging IC 100 may be configured to receive a charge input CHGIN. In an example embodiment, the charge input CHGIN may correspond to a charging current having a constant value in a constant current (CC) period from among periods for charging the battery device 200, and may correspond to a charging voltage having a constant value in a constant voltage (CV) period.

In an example embodiment, the charging IC 100 may be connected to a travel adapter (TA) (not shown) to receive the charge input CHGIN from the TA. The TA may transform power supplied from an alternating current (AC) at 110 V to 220 V, which is household power supply, or other power supply units (e.g., a computer), into a direct current (DC) power used to charge a battery and provide the DC power to the electronic device 10. In an example embodiment, the charging IC 100 may be connected to an auxiliary battery (not shown) and may charge the battery device 200 by using DC power received from the auxiliary battery. The charging IC 100 may be connected to a wireless charging circuit (not shown) or configured to include a wireless charging circuit (not shown) and receive the charge input CHGIN from the wireless charging circuit.

The first charger 110 may be connected to the first terminal T1 of the battery device 200, and the second charger 120 may be connected to the second terminal T2 of the battery device 200. In an example embodiment, when the charge input CHGIN is received, one of the first charger 110 and the second charger 120 may be selected to perform a charging operation for the battery device 200. However, example embodiments are not limited thereto, and, in an example embodiment, the first charger 110 and the second charger 120 at which the charge input CHGIN is received may simultaneously perform a charging operation for the battery device 200.

In an example embodiment, the first charger 110 may receive the charge input CHGIN and generate the first charging current ICH_1 based on the received charge input CHGIN. The first charger 110 may provide the first charging current ICH_1 to the first terminal T1 of the battery device 200. In an example embodiment, the first charger 110 may be a switching charger or a linear charger. In an example embodiment, the first charger 110 may be activated in the first charging mode, and the first charging mode may correspond to a normal charging mode.

In an example embodiment, the second charger 120 may receive the charge input CHGIN and generate the second charging current ICH_2 based on the received charge input CHGIN. The second charger 120 may provide the second charging current ICH_2 to the second terminal T2 of the battery device 200. In an example embodiment, the second charger 120 may be activated in the second charging mode, and the second charging mode may be a quick charging mode. The battery device 200 may be charged faster in the second charging mode than in the first charging mode.

In an example embodiment, the connection circuit 130 may be configured such that the first battery 211 and the second battery 212 are connected to each other in parallel in the first charging mode (e.g., the normal charging mode), and the first battery 211 and the second battery 212 are connected to each other in series in the second charging mode (e.g., the quick charging mode). The connection circuit 130 may be configured such that the first battery 211 and the second battery 212 are connected with each other in parallel in the battery-only mode. Herein, the term "operation modes" may collectively refer to the battery-only mode, the first charging mode, and the second charging mode.

The connection circuit 130 may include a plurality of switching elements (not shown in FIG. 1) for controlling a connection relationship between the first battery 211 and the second battery 212. The connection circuit 130 may be configured to balance a voltage of the first battery 211 and a voltage of the second battery 212.

In detail, the connection circuit 130 may control connection of the first battery 211 and the second battery 212 according to operation modes, and may control connections to charge one of the first battery 211 or the second battery 212 (which may be insufficiently charged or has a relatively low voltage) by using energy of the other one (which is overcharged or has a relatively high voltage). Therefore, voltages of the first battery 211 and the second battery 212 may be controlled to be balanced with respect to each other.

In balancing, a balancing current flows through the first battery 211 or the second battery 212 to balance the voltages of the first battery 211 and the second battery 212. When a difference between the voltages of the first battery 211 and the second battery 212 exceeds a certain value, the balancing current may be greater than an allowable value and may degrade the first battery 211 or the second battery 212. To avoid this, the connection circuit 130 according to an example embodiment may employ a first regulating circuit 131 and a second regulating circuit 132.

The first regulating circuit 131 may first receive and regulate a first balancing current flowing to the first battery 211, and provide the regulated first balancing current to the first battery 211. The second regulating circuit 132 may first receive and regulate a second balancing current flowing to the second battery 212, and provide the regulated second balancing current to the second battery 212. Hereinafter, the operation for regulating a balancing current to be lower than a reference current may be referred to as an operation for lowering a balancing speed. Thus, the charging IC 100 may regulate a balancing speed in an operation for balancing the voltages of the first battery 211 and the second battery 212.

In an example embodiment, the first regulating circuit 131 and the second regulating circuit 132 may respectively regulate the first balancing current and the second balancing current to be lower than a predetermined reference current, while considering loss that may occur as the first balancing current and the second balancing current flow. The first regulating circuit 131 and the second regulating circuit 132 may continuously check whether the first balancing current and the second balancing current exceed the reference current by monitoring the first balancing current and the second balancing current, respectively, and, when any one of the first balancing current and the second balancing current exceeds the reference current, any one of the first regulating circuit 131 and the second regulating circuit 132 may perform a regulating operation.

In an example embodiment, the first regulating circuit 131 and the second regulating circuit 132 may respectively regulate first balancing current and the second balancing current based on a temperature of the electronic device 10. The electronic device 10 may further include a temperature sensor (not shown) that senses an internal temperature thereof. The first regulating circuit 131 and the second regulating circuit 132 may receive external signals corresponding to the temperature sensed by the temperature sensor, and regulate the first balancing current and the second balancing current, respectively.

In an example embodiment, the charging IC 100 may further include a circuit or a block, e.g., a functional block, that supports at least one of various functions like an under-voltage lockout (UVLO) function, an over-current protection (OCP) function, an over-voltage protection (OVP) function, a soft-start function to reduce inrush current, a foldback current limit function, a hiccup mode function for short-circuit prevention, and an over-temperature protection (OTP) function, for proper operation even under power saving conditions.

The charging IC 100 according to an example embodiment may efficiently charge a plurality of batteries by changing a connection relationship between the batteries based on various charging modes, and may stably supply power through the batteries by regulating balancing currents generated due to differences between batteries so that the batteries are not degraded.

Figure 2A:
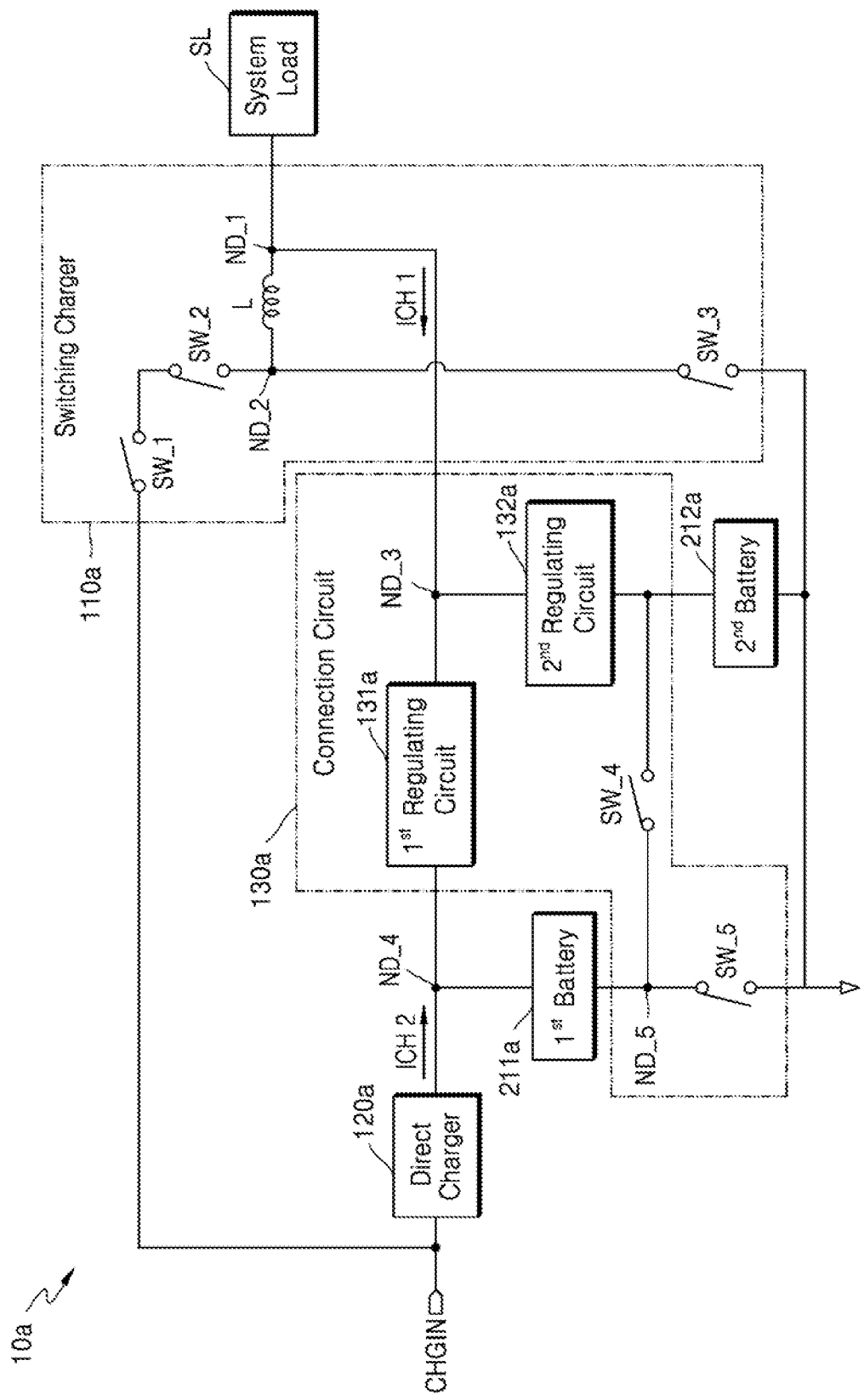
FIGS. 2A and 2B are diagrams showing electronic devices according to an example embodiment, respectively.
Figure 2B:
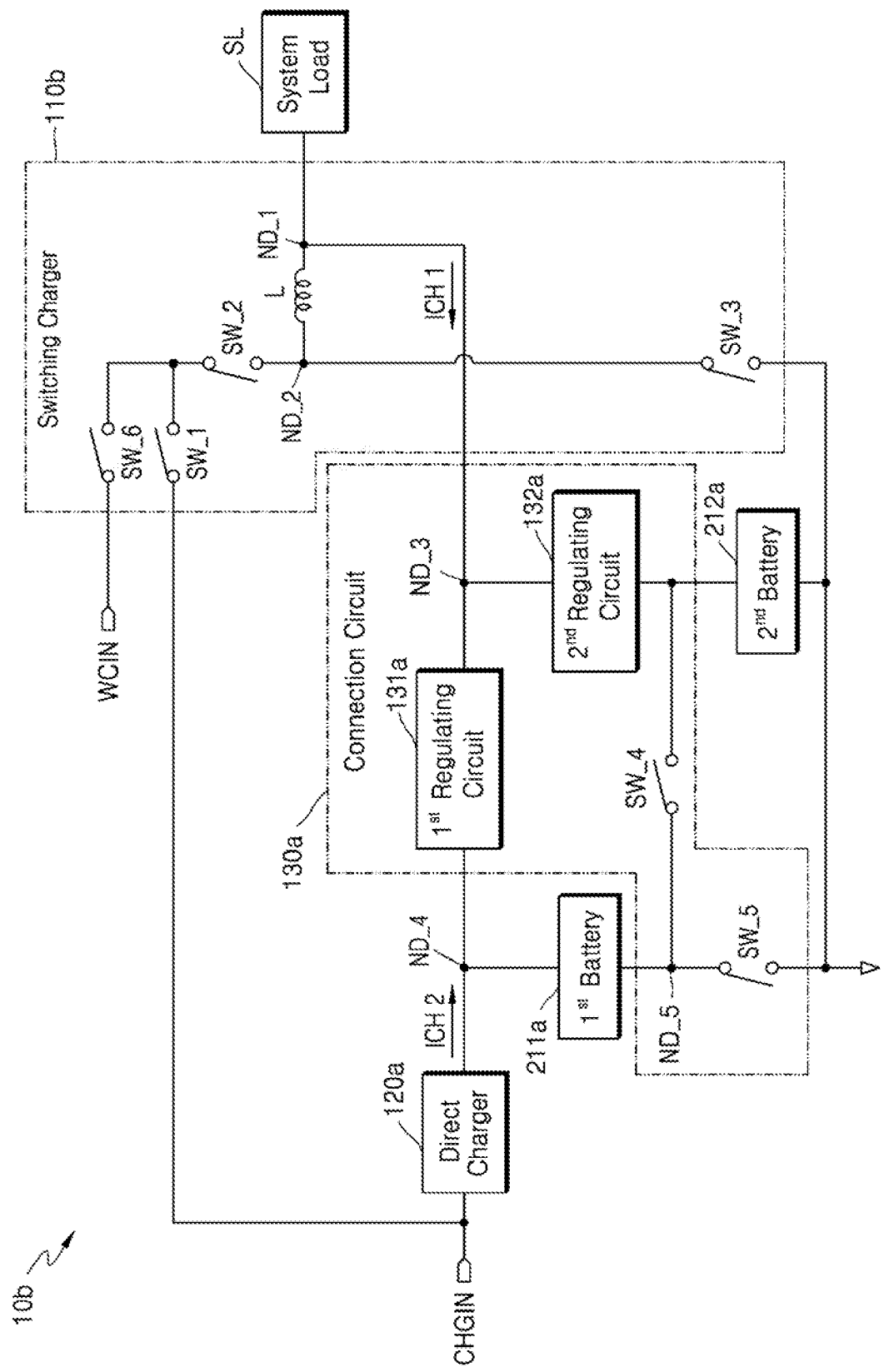

FIGS. 2A and 2B are diagrams showing electronic devices 10a and 10b according to an example embodiment, respectively.

Referring to FIG. 2A, the electronic device 10a may include a switching charger 110a, a direct charger 120a, a connection circuit 130a, a first battery 211a, a second battery 212a, and a system load SL.

The switching charger 110a may be an example of the first charger 110 of FIG. 1, the direct charger 120a may be an example of the second charger 120 of FIG. 1, and the connection circuit 130a may be an example of the connection circuit 130 of FIG. 1.

A circuit including the switching charger 110a, the direct charger 120a, and the connection circuit 130a may be referred to as a charging IC, and may be an example of the charging IC 100 of FIG. 1.

A device including the first battery 211a and the second battery 212a may be referred to as a battery device and may be an example of the battery device 200 of FIG. 1.

The system load SL may be chips or modules included in the electronic device 10a, e.g., a modem, an application processor, a memory, a display, etc. In an example embodiment, the system load SL may be an operation block, a functional block, or an IP block included in the electronic device 10a, e.g., a multimedia block in an application processor, a memory controller, etc. The system load SL may also be referred to as a consumption block or a load.

In an example embodiment, the switching charger 110a may include first to third switching elements SW_1 to SW_3 and an inductor element L. In an example embodiment, the first to third switching elements SW_1 to SW_3 may be implemented as power switching elements. However, the structure of the switching charger 110a is not limited thereto, and, in an example embodiment, the number of switching elements or the number of inductor elements included in the switching charger 110a may vary. The switching charger 110a may be coupled to the system load SL at a first node ND_1. The switching charger 110a may be referred to as a "dual output charger". Herein, although a third node ND_3 (described below) and the first node ND_1 are referred to differently, it is merely for convenience of explanation, and the third node ND_3 may be substantially the same as the first node ND_1.

The first switching element SW_1 and the second switching element SW_2 may be connected in series between a terminal for receiving the charge input CHGIN and a second node ND_2, and may provide the charge input CHGIN to the second node ND_2. In an example embodiment, the first switching element SW_1 may be turned on in the first charging mode, and thus, the first switching element SW_1 may be referred to as a "charging switch". The third switching element SW_3 may be connected between the second node ND_2 and a ground and may provide a ground voltage to the second node ND_2. The inductor element L may be connected between the first node ND_1 and the second node ND_2. The second switching element SW_2 and the third switching element SW_3 may be alternately turned on.

In an example embodiment, in the first charging mode, the switching charger 110a may provide the first charging current ICH_1 to the battery device through the third node ND_3. In an example embodiment, a battery current may be provided from the battery device to the system load SL, and the battery current may flow in a direction opposite to the first charging current ICH_1.

In an example embodiment, the direct charger 120a may be an example of the second charger 120 of FIG. 1. In an example embodiment, the direct charger 120a may directly charge the battery device by providing the second charging current ICH_2 to a fourth node ND_4 connected to an anode of the first battery 211a in the second charging mode. The direct charger 120a may directly charge the battery device using a direct charging method, in which the charge input CHGIN is directly input to the battery device. The charging efficiency of the direct charging method may be higher than the charging efficiency of the switching charging method using the switching charger 110a.

In an example embodiment, the connection circuit 130a may include a first regulating circuit 131a, a second regulating circuit 132a, a fourth switching element SW_4, and a fifth switching element SW_5. The first regulating circuit 131a may be connected between the third node ND_3 and the fourth node ND_4. The second regulating circuit 132a may be connected between the third node ND_3 and an anode of the second battery 212a. The fourth switching element SW_4 may be connected between a cathode of the first battery 211a and the anode of the second battery 212a. The fifth switching element SW_5 may be connected between the cathode of the first battery 211a and the ground.

The connection circuit 130a may turn off the fourth switching element SW_4 and turn on the fifth switching element SW_5 in the first charging mode or the battery-only mode, to connect the first battery 211a and the second battery 212a to each other in parallel.

The connection circuit 130a may turn on the fourth switching element SW_4 and turn off the fifth switching element SW_5 in the second charging mode, to connect the first battery 211a and the second battery 212a to each other in series.

In an example embodiment, when the voltage of the second battery 212a is greater than the voltage of the first battery 211a, the first regulating circuit 131a, which is connected to the first battery 211a in series, may regulate a first balancing current flowing to the first battery 211a. When the voltage of the first battery 211a is greater than the voltage of the second battery 212a, the second regulating circuit 132a, which is connected to the second battery 212a in series, may regulate a second balancing current flowing to the second battery 212a.

Referring to FIG. 2B, the electronic device 10b may include a switching charger 110b that further includes a sixth switching element SW_6 as compared to the switching charger 110a of FIG. 2A.

The sixth switching element SW_6 may be connected to a terminal for receiving a wireless charge input WCIN, and may be connected to the second switching element SW_2 in series. Therefore, the switching charger 110b may perform a charging operation for a battery device or a power supply operation for the system load SL using one of the wireless charge input WCIN and the charge input CHGIN.

Other descriptions identical to those already given above with reference to FIG. 2A are omitted.

Figure 3A:
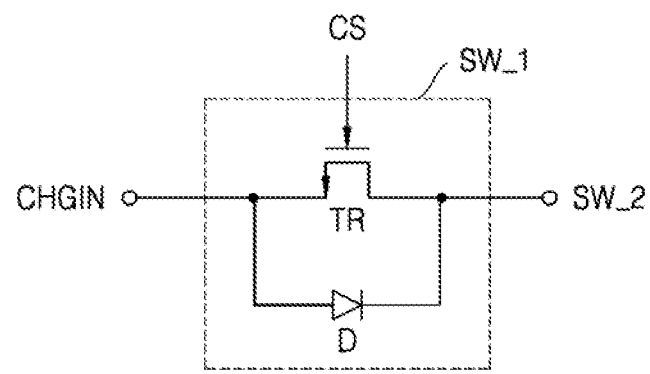
FIG. 3A is a circuit diagram showing an example of a first switching element shown in FIG. 2A.
Figure 3B:
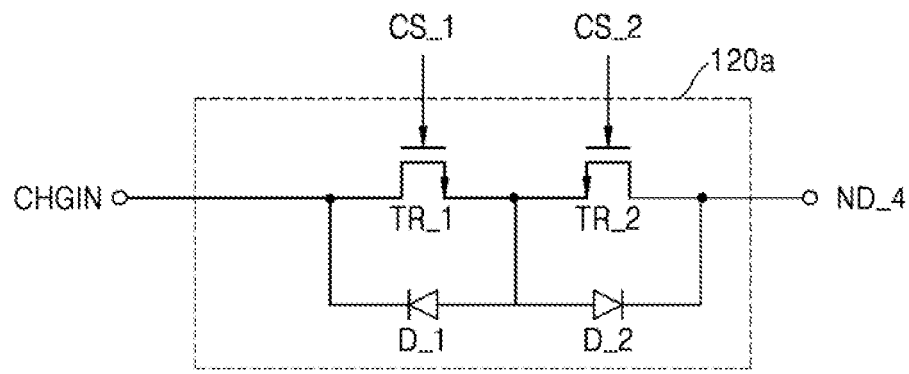
FIG. 3B is a circuit diagram showing an example of a direct charger shown in FIG. 2A.

FIG. 3A is a circuit diagram showing an example of the first switching element SW_1 shown in FIG. 2A, and FIG. 3B is a circuit diagram showing an example of the direct charger 120a shown in FIG. 2A.

Referring to FIGS. 2A and 3A, the first switching element SW_1 may include a transistor TR and a diode D.

The transistor TR may be an N-channel metal oxide semiconductor (NMOS) transistor driven by a control signal CS. In an example embodiment, the transistor TR may include a source for receiving the charge input CHGIN, a gate to which the control signal CS is applied, and a drain connected to the second switching element SW_2. However, example embodiments are not limited thereto, and the transistor TR may be implemented as a P-channel metal oxide semiconductor (PMOS) transistor.

The diode D may be a parasitic diode of the transistor TR and may prevent flow of an unintended leakage current due to the diode D even when the first switching element SW_1 is turned off.

The second to sixth switching elements SW_2 to SW_6 shown in FIGS. 2A and 2B may be implemented similar or identical to the first switching element SW_1 shown in FIG. 3A.

Referring to FIG. 3B, the direct charger 120a may include a first transistor TR_1, a second transistor TR_2, a first diode D_1, and a second diode D_2. The first transistor TR_1 and the second transistor TR_2 may be NMOS transistors driven by a first control signal CS_1 and a second control signal CS_2, respectively. In an example embodiment, the first transistor TR_1 may include a drain for receiving the charge input CHGIN, a gate to which the first control signal CS_1 is applied, and a source connected to a source of the second transistor TR_2. The second transistor TR_2 may include a source connected to the source of the first transistor TR_1, a gate to which the second control signal CS_2 is applied, and a drain connected to the fourth node ND_4. However, example embodiments are not limited thereto, and the first transistor TR_1 and the second transistor TR_2 may be implemented as PMOS transistors. The first diode D_1 and the second diode D_2 may be parasitic diodes of the first transistor TR_1 and the second transistor TR_2, respectively, and, when the direct charger 120a is deactivated, may prevent an unintended leakage current from flowing.

Figure 4:
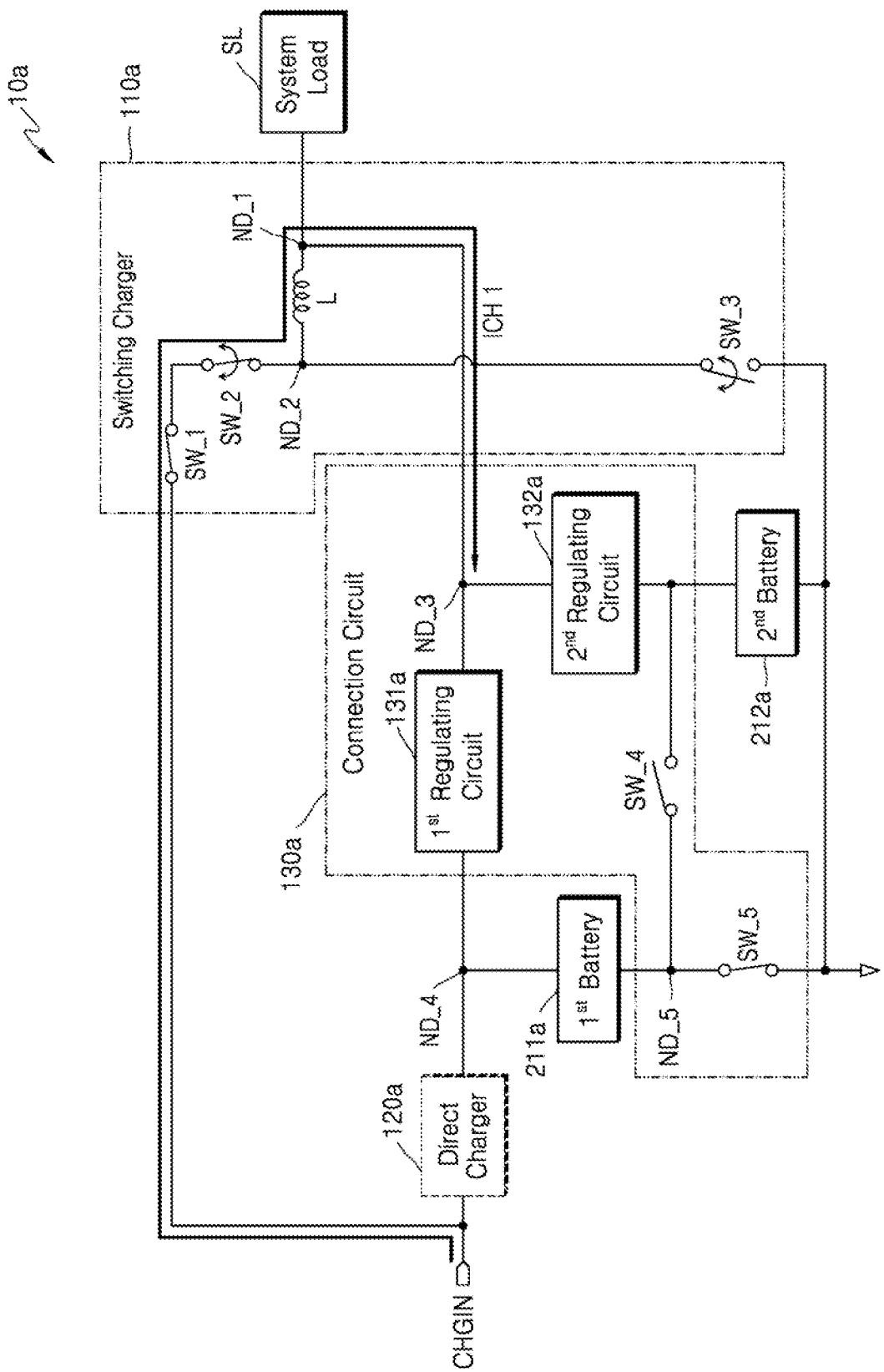
FIG. 4 is a diagram showing a first charging mode of a charging IC according to an example embodiment.

FIG. 4 is a diagram showing a first charging mode of a charging IC according to an example embodiment.

Referring to FIG. 4, in the first charging mode, the switching charger 110a may be activated and the direct charger 120a may be deactivated. In the first charging mode, the first to third switching elements SW_1 to SW_3 may be selectively turned on, and thus, a first charging path may be formed through which the first charging current ICH_1 flows. The first charging current ICH_1 may be provided to the third node ND_3 through the first charging path, to charge the first battery 211a and the second battery 212a connected to each other in parallel.

In an example embodiment, when there is a voltage difference between the first battery 211a and the second battery 212a connected to each other in parallel and a balancing current flows while the first battery 211a and the second battery 212a are being charged, the first regulating circuit 131a and the second regulating circuit 132a may regulate the balancing current. In an example embodiment, when the voltage of the second battery 212a is greater than the voltage of the first battery 211a, the first regulating circuit 131a may regulate a first balancing current flowing to the first battery 211a. On the other hand, when the voltage of the first battery 211a is greater than the voltage of the second battery 212a, the second regulating circuit 132a may regulate a second balancing current flowing to the second battery 212a. An example embodiment thereof will be described below with reference to FIGS. 16A and 16B.

Figure 5:
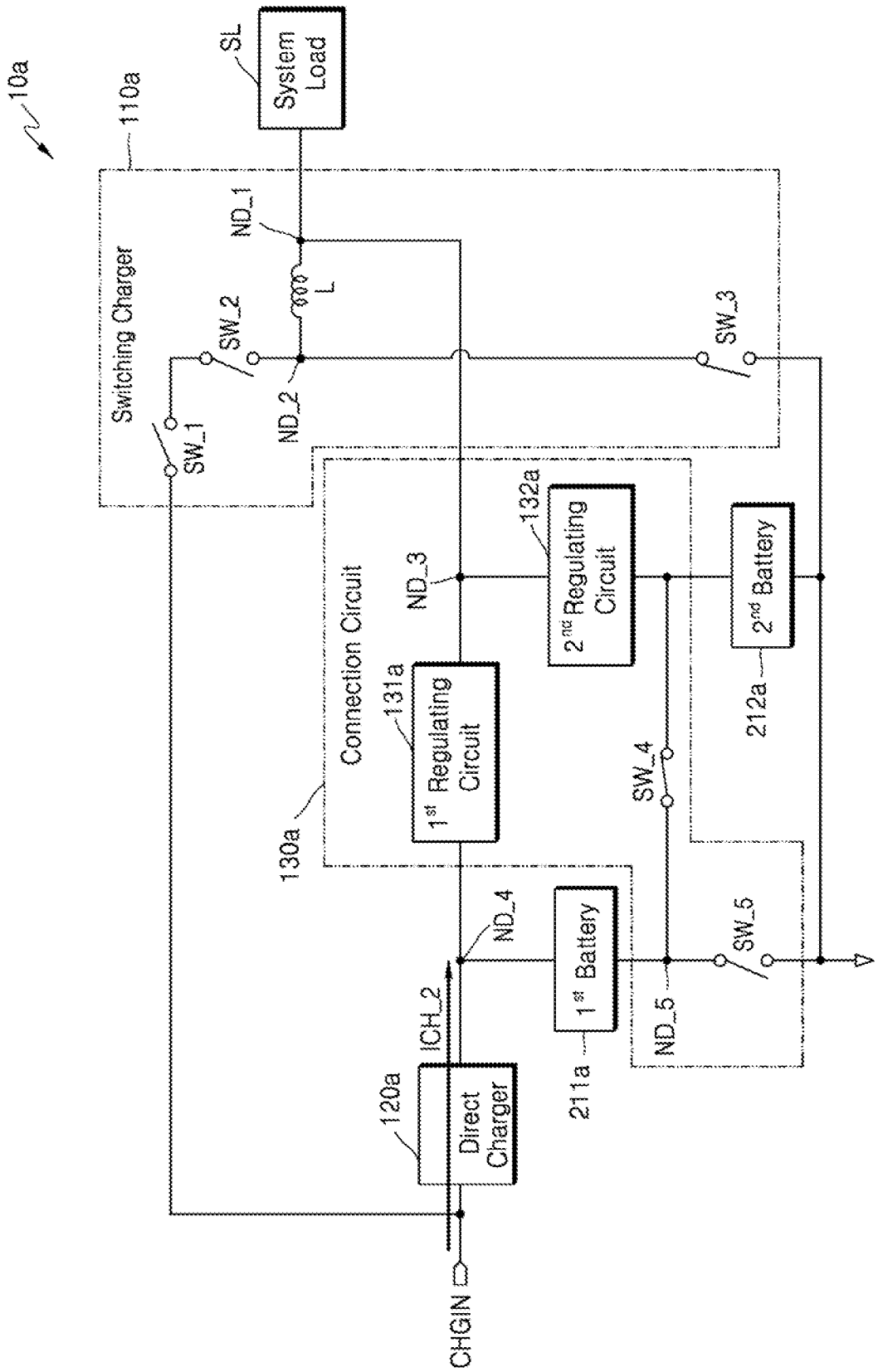
FIG. 5 is a diagram showing a second charging mode of a charging IC according to an example embodiment.

FIG. 5 is a diagram showing a second charging mode of a charging IC according to an example embodiment.

Referring to FIG. 5, in the second charging mode, the switching charger 110a may be deactivated and the direct charger 120a may be activated. In the second charging mode, the first to third switching elements SW_1 to SW_3 may be turned off, and thus, a second charging path may be formed through which the second charging current ICH_2 flows. The second charging current ICH_2 may be supplied to a high voltage terminal of a battery device, that is, an anode of the first battery 211a. In the second charging mode, the first battery 211a and the second battery 212a connected to each other in series may be charged by using the second charging current ICH_2.

In an example embodiment, the second charging mode may be a quick charging mode. In an example embodiment, the charge input CHGIN in the second charging mode may be provided at a higher voltage compared to the charge input CHGIN in the first charging mode. However, example embodiments are not limited thereto, and the charge input CHGIN in the second charging mode may be provided at a low voltage compared to the charge input CHGIN in the first charging mode. In the second charging mode, the first battery 211a and the second battery 212a may be charged at a high speed by using the direct charger 120a.

In another example embodiment, both the switching charger 110a and the direct charger 120a may be activated in the second charging mode. In an example embodiment, in the second charging mode, the direct charger 120a may charge the first battery 211a and the second battery 212a, and the switching charger 110a may supply power (or a system voltage or a system current) to the system load SL. In an example embodiment, by turning on the first switching element SW_1, controlling switching the second switching elements SW_2 on/off, and turning off the third switching elements SW_3, the switching charger 110a may supply power to the system load SL in a buck mode. Alternatively, in another example embodiment, the third switching element SW_3 may be turned on in the second charging mode, and thus, power (or a system voltage or a system current) may be supplied to the system load SL through the third node ND_3 to which the first battery 211a and the second battery 212a are connected.

In an example embodiment, when there is a voltage difference between the first battery 211a and the second battery 212a connected to each other in series and a balancing current flows while the first battery 211a and the second battery 212a are being charged, the first regulating circuit 131a and the second regulating circuit 132a may regulate the balancing current.

Figure 6:
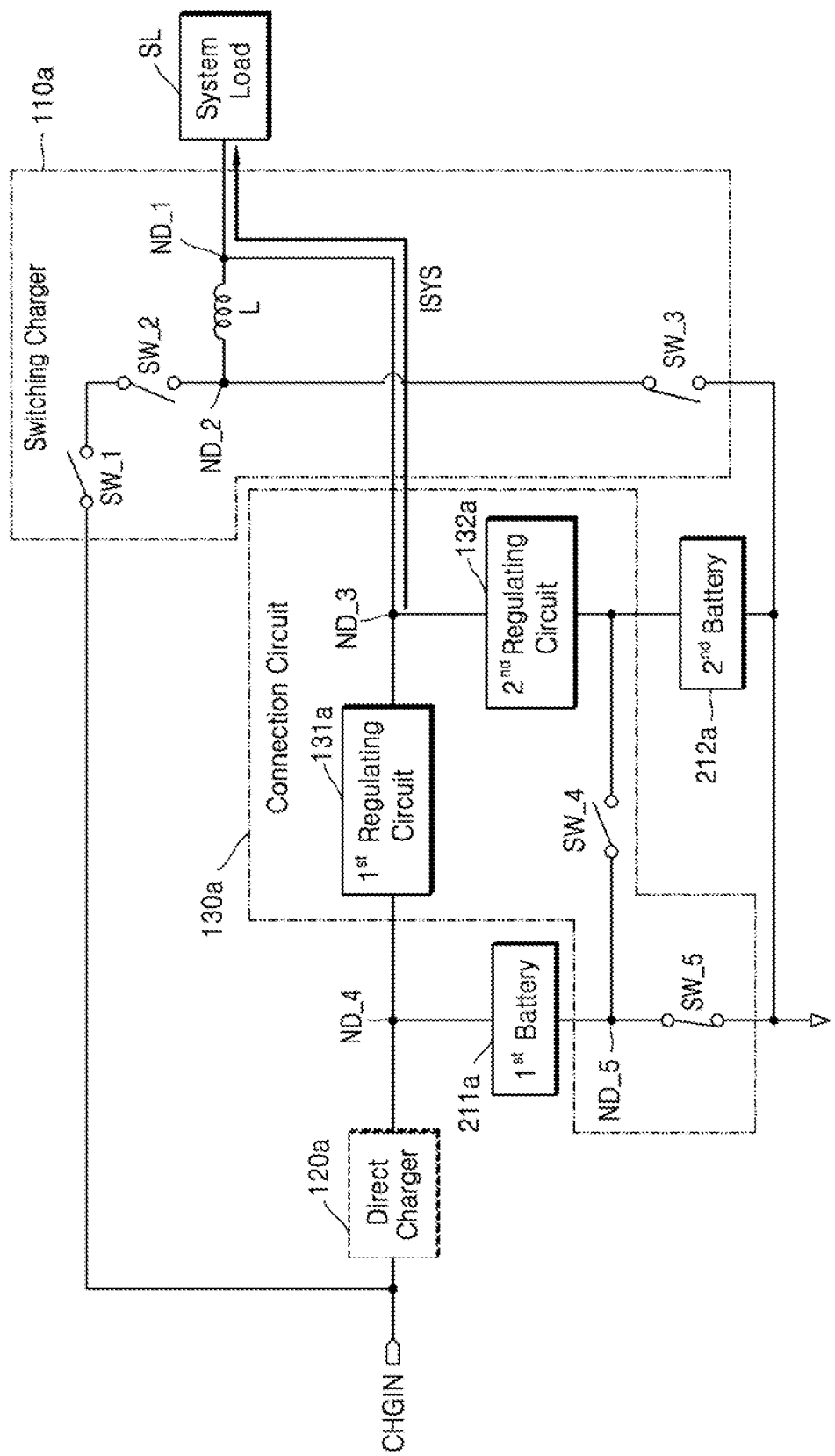
FIG. 6 is a diagram showing a battery-only mode of a charging IC according to an example embodiment.

FIG. 6 is a diagram showing a battery-only mode of a charging IC according to an example embodiment.

Referring to FIG. 6, in the battery-only mode, both the switching charger 110a and the direct charger 120a may be deactivated. In the battery-only mode, the fifth switching element SW_5 may be turned on, and thus, a discharging path may be formed. The battery-only mode may correspond to a case where a power source is not connected (e.g., a case where the charge input CHGIN is not applied). In the battery-only mode, an effective battery capacity may correspond to a sum of the capacity of the first battery 211a and the capacity of the second battery 212a. A system current ISYS may be supplied to the system load SL through the discharging path. In detail, the system current ISYS may be supplied to the system load SL from voltages of the first battery 211a and the second battery 212a connected to each other in parallel.

If the voltages of the first battery 211a and the second battery 212a drop to a certain voltage or below, the fifth switching element SW_5 may be turned off and the discharging path may be cut off.

In an example embodiment, when there is a voltage difference between the first battery 211a and the second battery 212a connected to each other in parallel and a balancing current flows while the first battery 211a and the second battery 212a are being discharged, the first regulating circuit 131a and the second regulating circuit 132a may regulate the balancing current. An example embodiment thereof will be described below with reference to FIGS. 10A and 10B.

Figure 7:
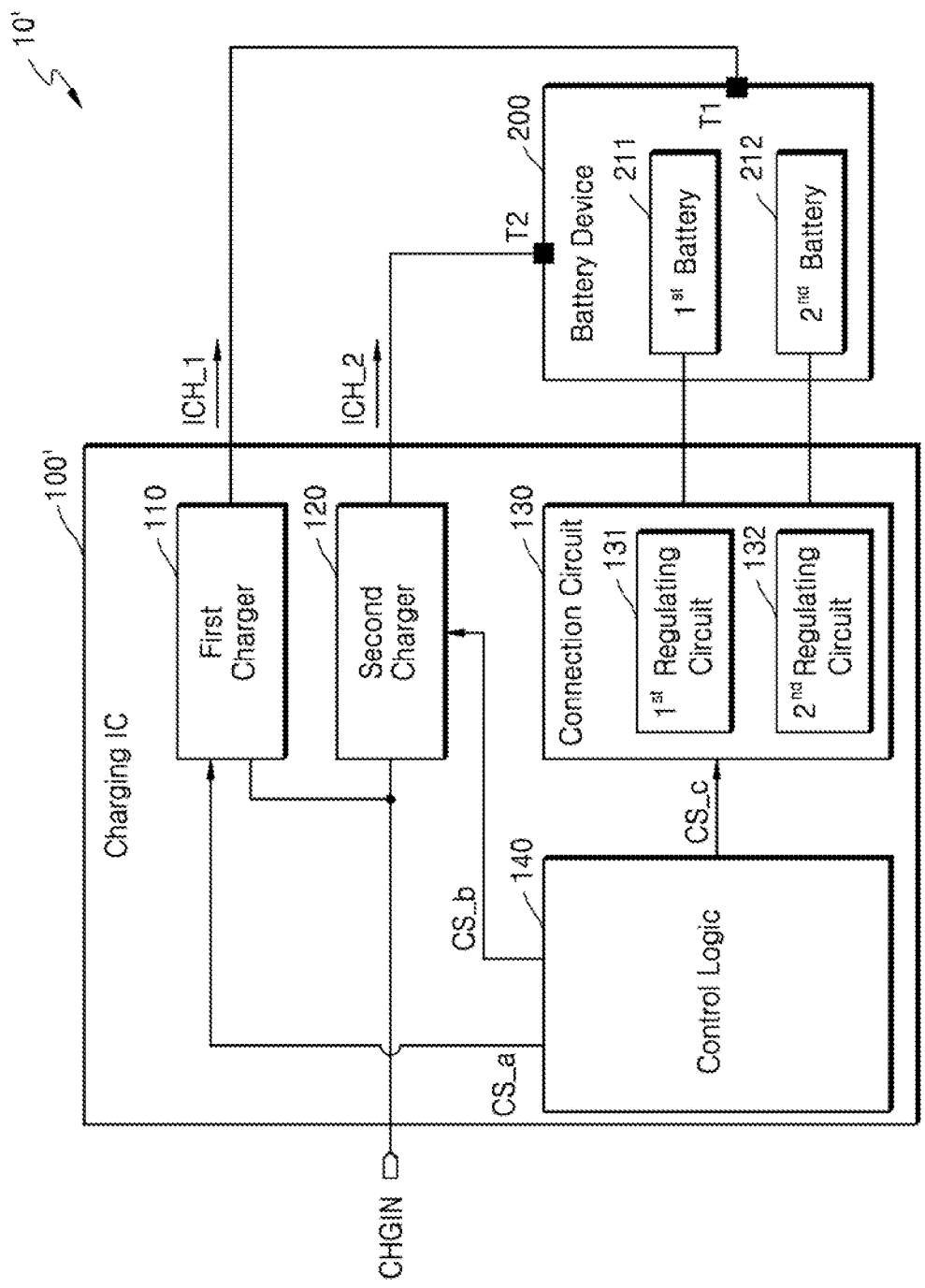
FIG. 7 is a block diagram showing an electronic device according to an example embodiment.

FIG. 7 is a block diagram showing an electronic device 10' according to an example embodiment.

Referring to FIG. 7, an electronic device 10' may include a charging IC 100' coupled to the battery device 200. The charging IC 100' may correspond to a modified example of the charging IC 100 of FIG. 1 in that the charging IC 100' further includes a control logic 140, compared to the charging IC 100 of FIG. 1. Descriptions given above with reference to FIGS. 1 to 6 may be applied to the electronic device 10'.

The control logic 140 may generate first, second, and third control signals CS_a, CS_b, and CS_c to control operations of the first charger 110, the second charger 120, and the connection circuit 130. In an example embodiment, the control logic 140 may generate the first to third control signals CS_a to CS_c based on the first charging mode, the second charging mode, or the battery-only mode to drive switching elements of the first charger 110, the second charger 120, and the connection circuit 130, and may further provide signals used for balancing current regulating operations of the first regulating circuit 131 and the second regulating circuit 132 of the connection circuit 130. The control logic 140 may also control the level of the charge input CHGIN.

However, example embodiments are not limited thereto, and, instead of the control logic 140, a micro controller unit (MCU) included in the electronic device 10' may generate the first to third control signals CS_a to CS_c. Further, the first to third control signals CS_a to CS_c may be generated by a processor other than the MCU, e.g., by a central processing unit (CPU), a controller, etc.

Hereinafter, for convenience of explanation, descriptions will be given based on an example of the electronic device 10' including the MCU. However, example embodiments are not limited thereto.

Figure 8:
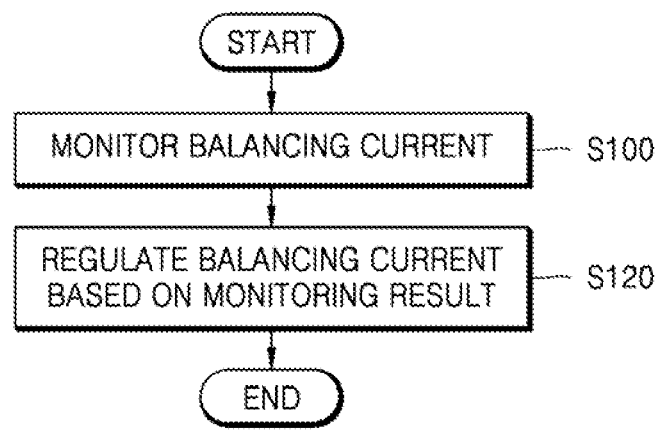
FIG. 8 is a flowchart of a method of regulating a balancing current, according to an example embodiment.

FIG. 8 is a flowchart of a method of regulating a balancing current, according to an example embodiment. Descriptions of FIG. 8 will be given below with further reference to FIG. 2A for better understanding.

Referring to FIGS. 2A and 8, in operation S100, the first regulating circuit 131a may monitor a first balancing current flowing to the first battery 211a. The first regulating circuit 131a may receive the first balancing current from the second battery 212a before the first battery 211a receives the first balancing current. The first regulating circuit 131a may monitor whether the first balancing current is below or equal to a reference current. In an example embodiment, the first regulating circuit 131a may monitor the first balancing current in the first charging mode, the second charging mode, and the battery-only mode. Meanwhile, in each of the first charging mode, the second charging mode, and the battery-only mode, a reference current compared to the first balancing current may be the same or different.

In operation S120, the first regulating circuit 131a may regulate the first balancing current based on a monitoring result. In detail, when the first balancing current exceeds the reference current, the first regulating circuit 131a may regulate the first balancing current to the reference current, and provide regulated first balancing current to the first battery 211a. When the first balancing current is below or equal to the reference current, the first regulating circuit 131a may provide the first balancing current to the first battery 211a without regulating the first balancing current.

It will be understood that the example embodiment of the first regulating circuit 131a shown in FIG. 8 may be applied to the second regulating circuit 132a.

Figure 9:
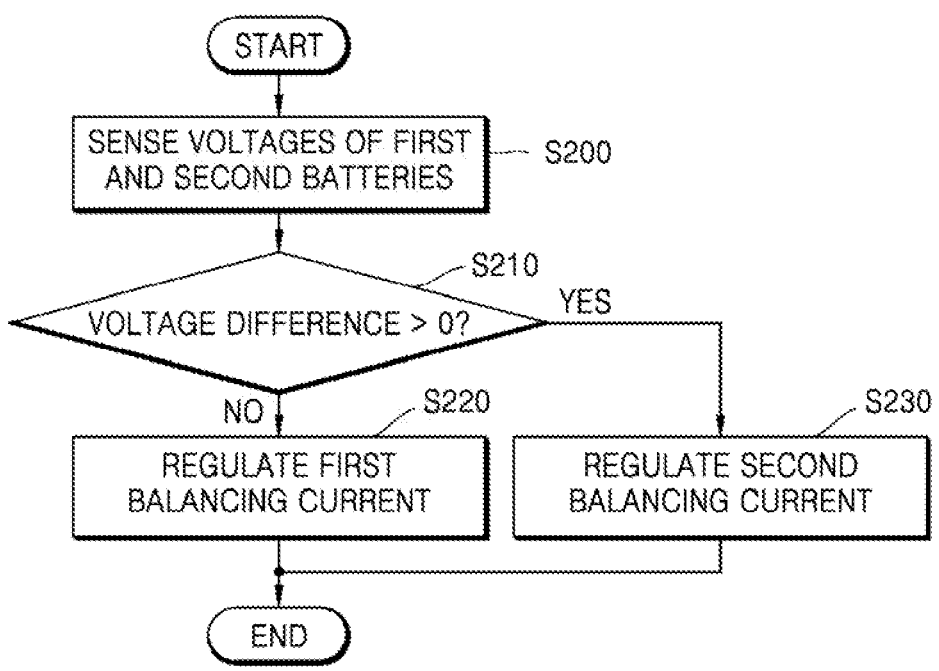
FIG. 9 is a flowchart of a method of regulating a balancing current, according to an example embodiment.

FIG. 9 is a flowchart of a method of regulating a balancing current, according to an example embodiment. Descriptions of FIG. 9 will be given below with further reference to FIG. 2A for better understanding.

Referring to FIGS. 2A and 9, a voltage of the first battery 211a and a voltage of the second battery 212a may be sensed in operation S200. Voltages of the first battery 211a and the second battery 212a may be sensed through a predetermined logic (e.g., the control logic 140 or the MCU of FIG. 7).

In operation S210, it may be determined whether a voltage difference between the first battery 211a and the second battery 212a is greater than 0. When a result of the determination in operation S210 is 'NO', the voltage of the second battery 212a may be higher than the voltage of the first battery 211a, and thus, the first balancing current may flow to the first battery 211a. Subsequently, in operation S220, the first regulating circuit 131a may be activated and regulate the first balancing current. When the result of the determination in operation S210 is 'YES', the voltage of the first battery 211a may be higher than the voltage of the second battery 212a, and thus, the second balancing current may flow to the second battery 212a. Subsequently, in operation S230, the second regulating circuit 132a may be activated and regulate the second balancing current.

Figure 10A:
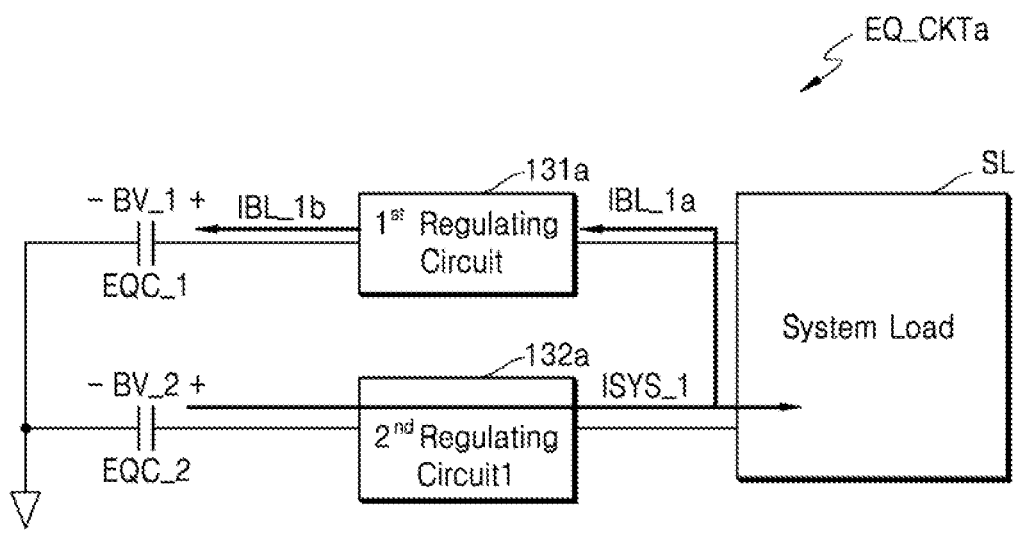
FIGS. 10A and 10B are diagrams for describing a method of regulating a balancing current in the battery-only mode according to an example embodiment.
Figure 10B:
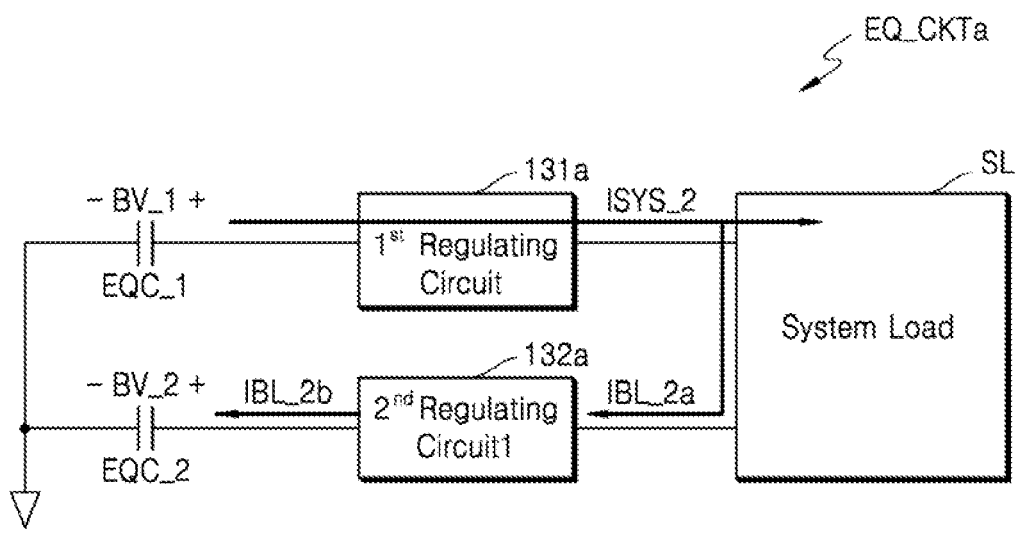

FIGS. 10A and 10B are diagrams for describing a method of regulating a balancing current in the battery-only mode according to an example embodiment. An equivalent circuit EQ_CKTa of FIGS. 10A and 10B schematically shows an equivalent circuit of the electronic device 10a in the battery-only mode of FIG. 6.

Referring to FIG. 10A, the equivalent circuit EQ_CKTa may include the first regulating circuit 131a, the second regulating circuit 132a, a first equivalent capacitor EQC_1, a second equivalent capacitor EQC_2, and the system load SL. The first equivalent capacitor EQC_1 may correspond to the first battery 211a of FIG. 6, and the second equivalent capacitor EQC_2 may correspond to the second battery 212a of FIG. 6. A first system current ISYS_1 may be provided from the second equivalent capacitor EQC_2 to the system load SL, and, when a voltage BV_2 of the second equivalent capacitor EQC_2 is higher than a voltage BV_1 of the first equivalent capacitor EQC_1, a first balancing current IBL_1a may flow to the first equivalent capacitor EQC_1. When the first balancing current IBL_1a exceeds a reference current, the first regulating circuit 131a may regulate the first balancing current IBL_1a and provide a regulated first balancing current IBL_1b to the first equivalent capacitor EQC_1.

Referring to FIG. 10B, a second system current ISYS_2 may be provided from the first equivalent capacitor EQC_1 to the system load SL, and, when the voltage BV_1 of the first equivalent capacitor EQC_1 is higher than the voltage BV_2 of the second equivalent capacitor EQC_2, a second balancing current IBL_2a may flow to the second equivalent capacitor EQC_2. When the second balancing current IBL_2a exceeds the reference current, the second regulating circuit 132a may regulate the second balancing current IBL_2a and provide a regulated second balancing current IBL_2b to the second equivalent capacitor EQC_2.

Figure 11:
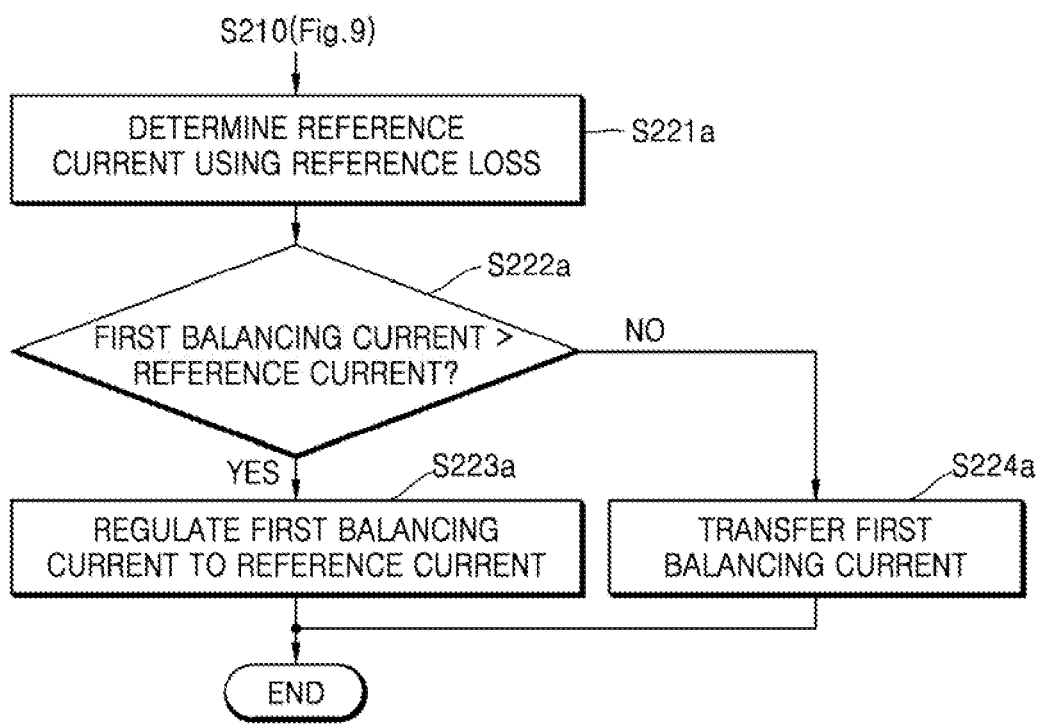
FIG. 11 is a flowchart showing an example embodiment of operation S220 of FIG. 9.

FIG. 11 is a flowchart showing an example embodiment of operation S220 of FIG. 9. Descriptions of FIG. 11 will be given below with further reference to FIG. 2A for better understanding.

Referring to FIGS. 2A and 11, subsequent to operation S210 of FIG. 9, a reference current may be determined using a reference loss in operation S221a. A loss may refer to energy loss caused by a balancing current. When the balancing current is regulated to be very small (to minimize the loss), a time elapsed for voltages of batteries to become equal increases, and thus, a balancing speed may decrease. On the contrary, when the balancing current is regulated very little to maximize the balancing speed, loss due to the balancing current increases. Thus, the balancing speed and the loss may be in a trade-off relationship, and the reference loss may be set in advance, such that a balancing operation may be performed with an optimized loss and at an optimized balance speed in the trade-off relationship. A reference current may be determined based on a pre-set reference loss.

In operation S222a, the first regulating circuit 131a may determine whether the first balancing current exceeds the reference current. When a result of the determination in operation S222a is 'YES', the first regulating circuit 131a may regulate the first balancing current to be below or equal to the reference current, and may provide the regulated first balancing current to the first battery 211a. When a result of the determination in operation S222a is 'NO', the first regulating circuit 131a may transfer the first balancing current to the first battery 211a without regulation.

Figure 12A:
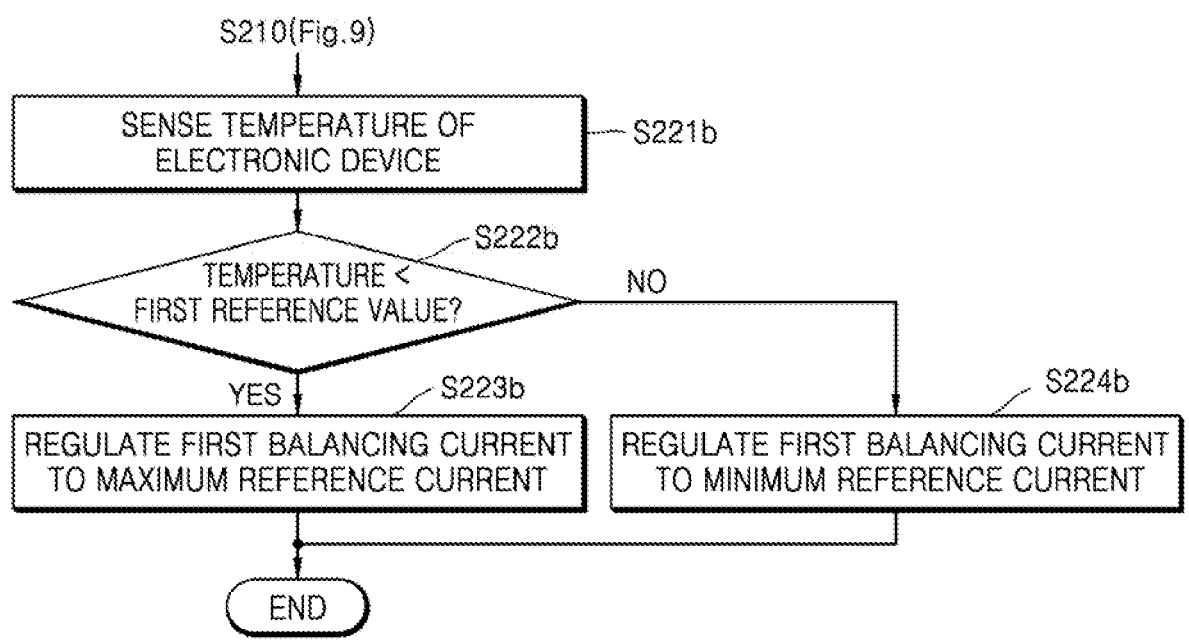
FIGS. 12A and 12B are flowcharts showing an example embodiment of operation S220.
Figure 12B:
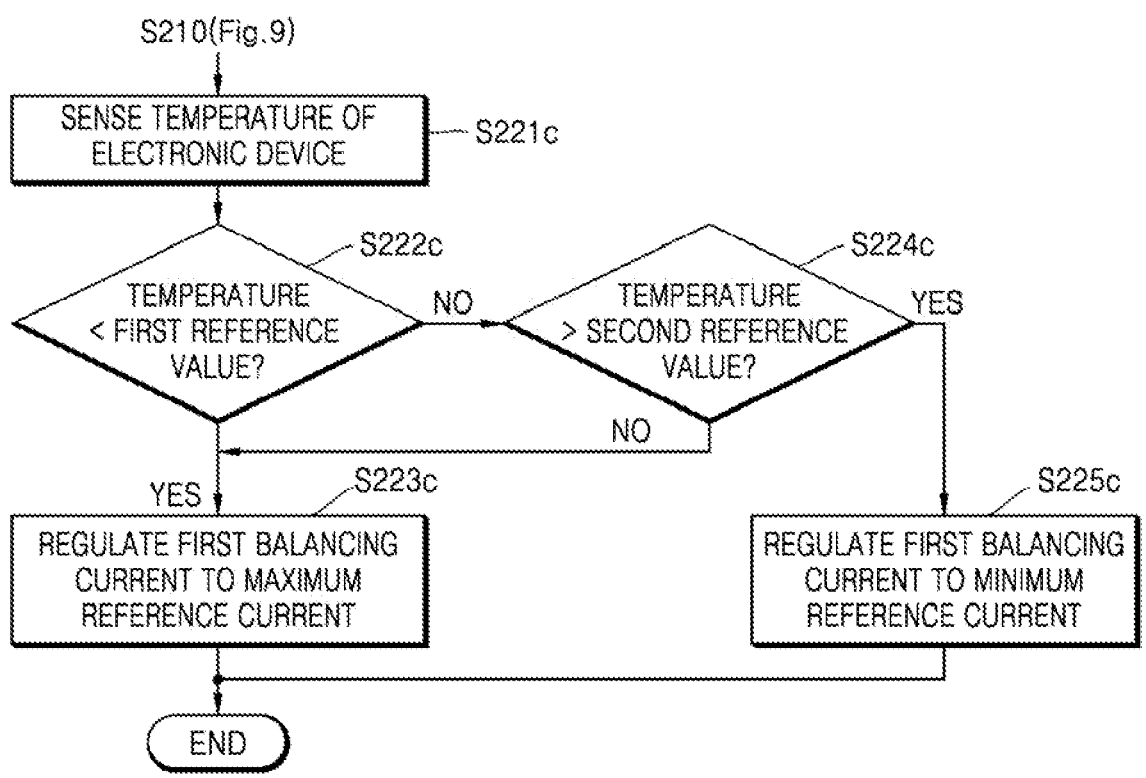

FIGS. 12A and 12B are flowcharts showing an example embodiment of operation S220. Descriptions of FIGS. 12A and 12B will be given below with further reference to FIG. 2A for better understanding.

Referring to FIGS. 2A and 12A, subsequent to operation S210 of FIG. 9, a temperature of the electronic device 10a may be sensed in operation S221b. In an example embodiment, the temperature of a battery device including the first battery 211a and the second battery 212a or the temperature of a charging IC may be sensed instead of the temperature of the electronic device 10a. It may be determined whether the temperature sensed in operation S222b is below a first reference value. Operation S222b may be performed by the first regulating circuit 131a or a predetermined MCU included in the electronic device 10a. When a result of the determination in operation S222b is 'YES', the first regulating circuit 131a may regulate a first balancing current to a maximum reference current. In an example embodiment, the first regulating circuit 131a may receive a predetermined signal for regulating the first balancing current to the maximum reference current from an external device (e.g., an MCU). When a result of the determination in operation S222b is 'NO', the first regulating circuit 131a may regulate the first balancing current to a minimum reference current. In an example embodiment, the first regulating circuit 131a may receive a predetermined signal for regulating the first balancing current to the minimum reference current from an external device (e.g., an MCU). The maximum reference current and the minimum reference current may be set in advance. The first regulating circuit 131a may regulate the first balancing current into pulses having a variable duty ratio, a maximum reference current, and a minimum reference current. Detailed descriptions thereof will be given later with reference to FIG. 13.

Referring further to FIG. 12B, unlike in FIG. 12A, a temperature condition for regulating the first balancing current to the minimum reference current may be further added. In detail, when a result of the determination in operation S222c is 'NO', it may be determined subsequently in operation S224c whether a sensed temperature is greater than a second reference value. When a result of the determination in operation S224c is 'YES', the first regulating circuit 131a may regulate the first balancing current to the minimum reference current. When the result of the determination in operation S224c is 'NO', operation S223c may be performed subsequently.

In an example embodiment, the first reference value and the second reference value may be different from each other, may be set in advance, and may vary considering factors like a state of the electronic device 10a and states of the first battery 211a and the second battery 212a.

Figure 13:
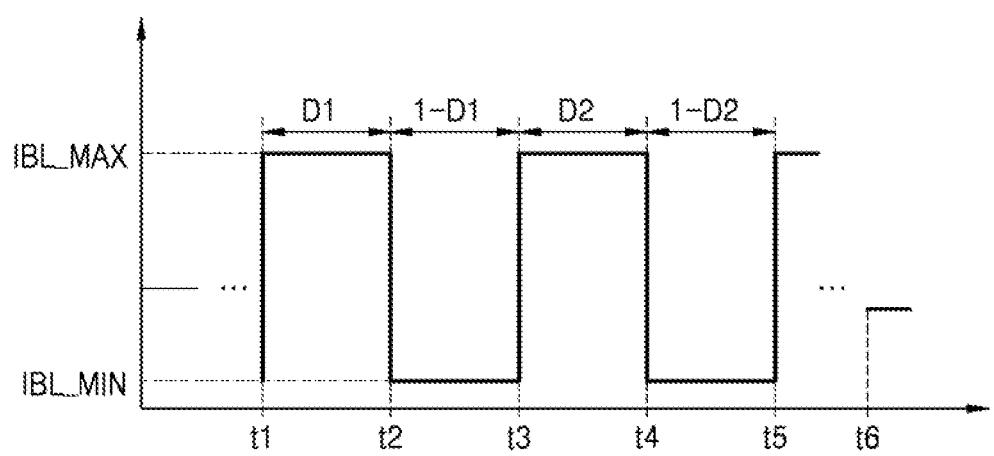
FIG. 13 is a timing diagram showing a method of regulating a first balancing current according to the embodiment shown in FIGS. 12A and 12B.

FIG. 13 is a timing diagram showing a method of regulating a first balancing current according to the embodiment shown in FIGS. 12A and 12B.

Referring to FIGS. 2A and 13, the first regulating circuit 131a may regulate the first balancing current based on the temperature of the electronic device 10a or a battery device. Between a first time point t1 and a sixth time point t6, the first regulating circuit 131a may regulate the first balancing current. The first regulating circuit 131a may regulate the first balancing current based on the temperature of the electronic device 10a or the battery device, such that a maximum reference current IBL_MAX and a minimum reference current IBL_MIN are alternately repeated. In an example embodiment, a first duty ratio D1 of the regulated first balancing current between a first time point t1 to a third time point t3 may be equal to or different from a second duty ratio D2 between the third time point t3 to a fifth time point t5. The duty ratio may vary according to the temperature of the electronic device 10a or the battery device.

Meanwhile, a period during which the regulated first balancing current is the maximum reference current IBL_MAX may be referred to as a heating period, whereas a period during which the regulated first balancing current is the minimum reference current IBL_MIN may be referred to as a cooling period. In an example embodiment, the first regulating circuit 131a may regulate the first balancing current by alternately repeating the heating period and the cooling period, thereby maintaining the temperature of the electronic device 10a or the battery device constant. As a result, the electronic device 10a or the battery device may operate stably.

FIGS. 14A to 14D are diagrams showing first regulating circuits 131_1 and 131_2 according to an example embodiment. Embodiments of the first regulating circuits 131_1 and 131_2 described below may also be applied to the second regulating circuit described above.

Figure 14A:
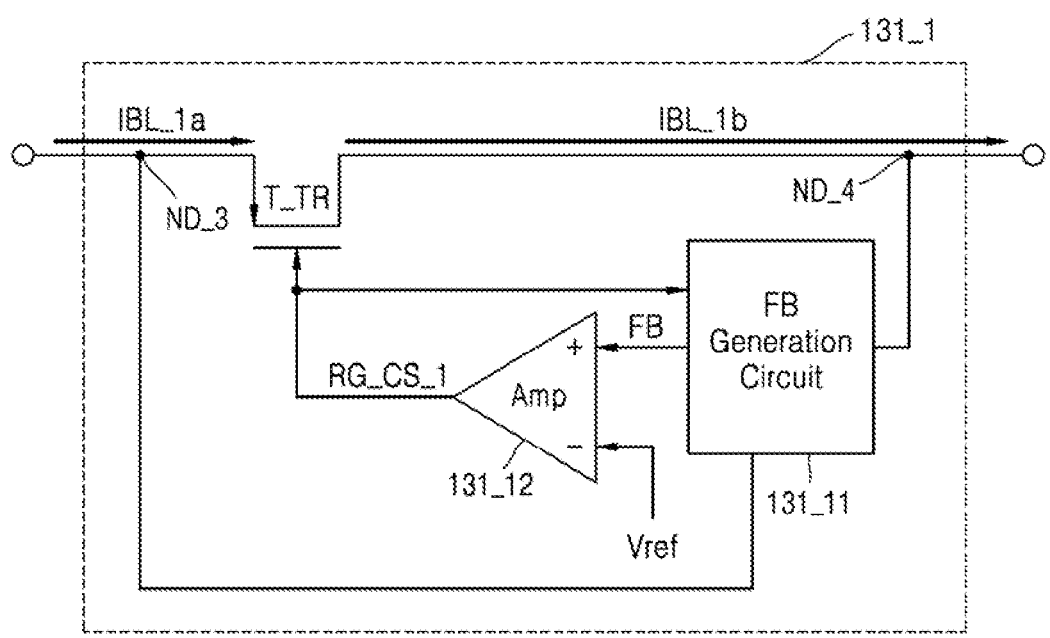
FIGS. 14A to 14D are diagrams showing first regulating circuits according to an example embodiment.
Figure 14B:
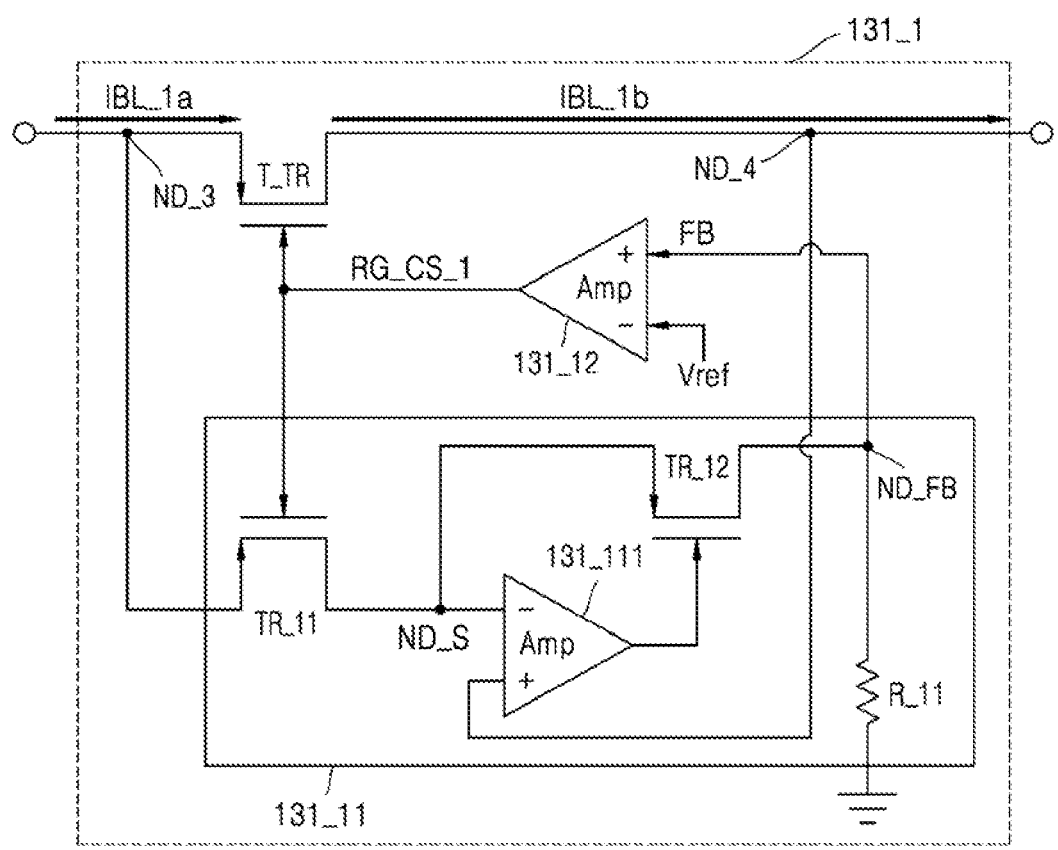
Figure 14C:
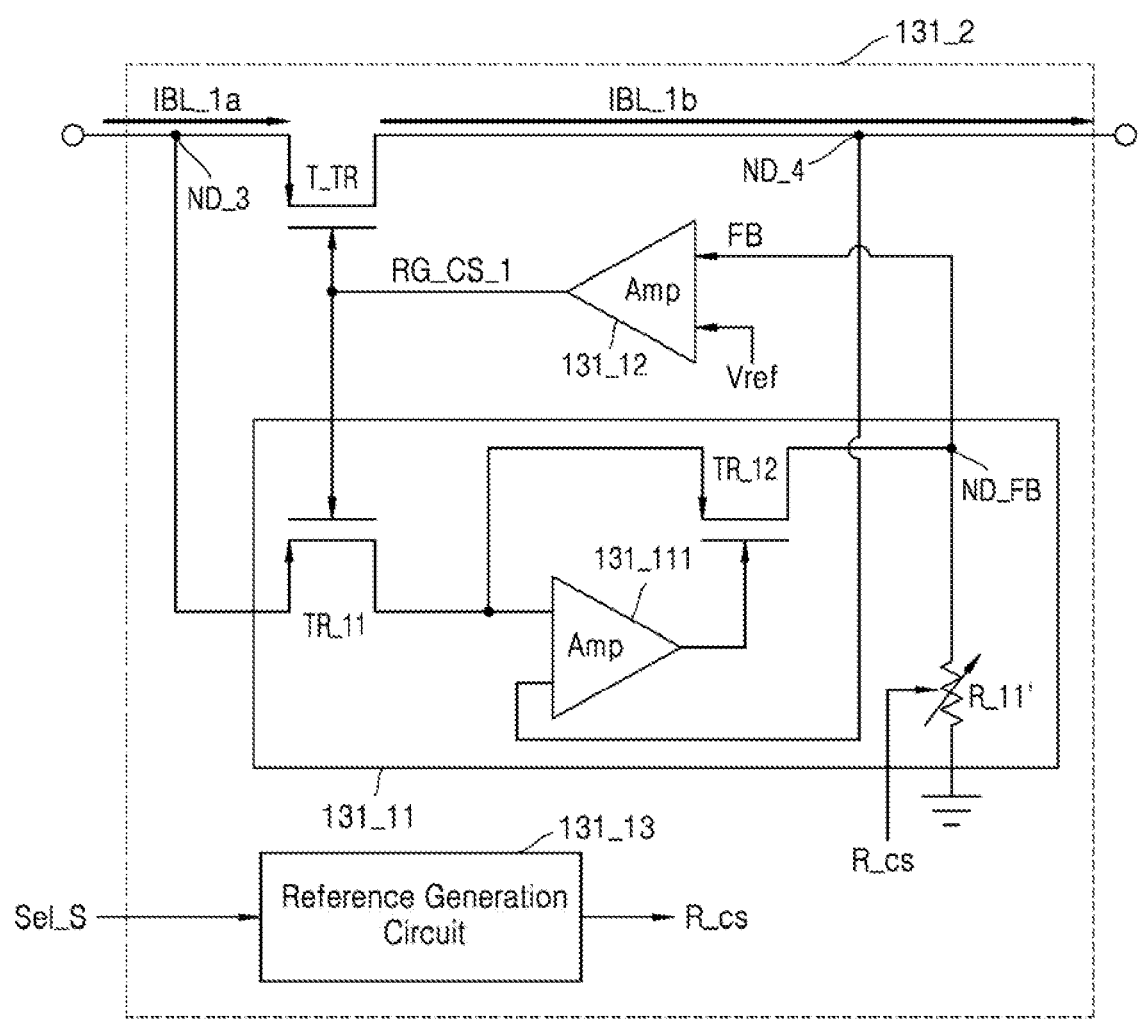
Figure 14D:
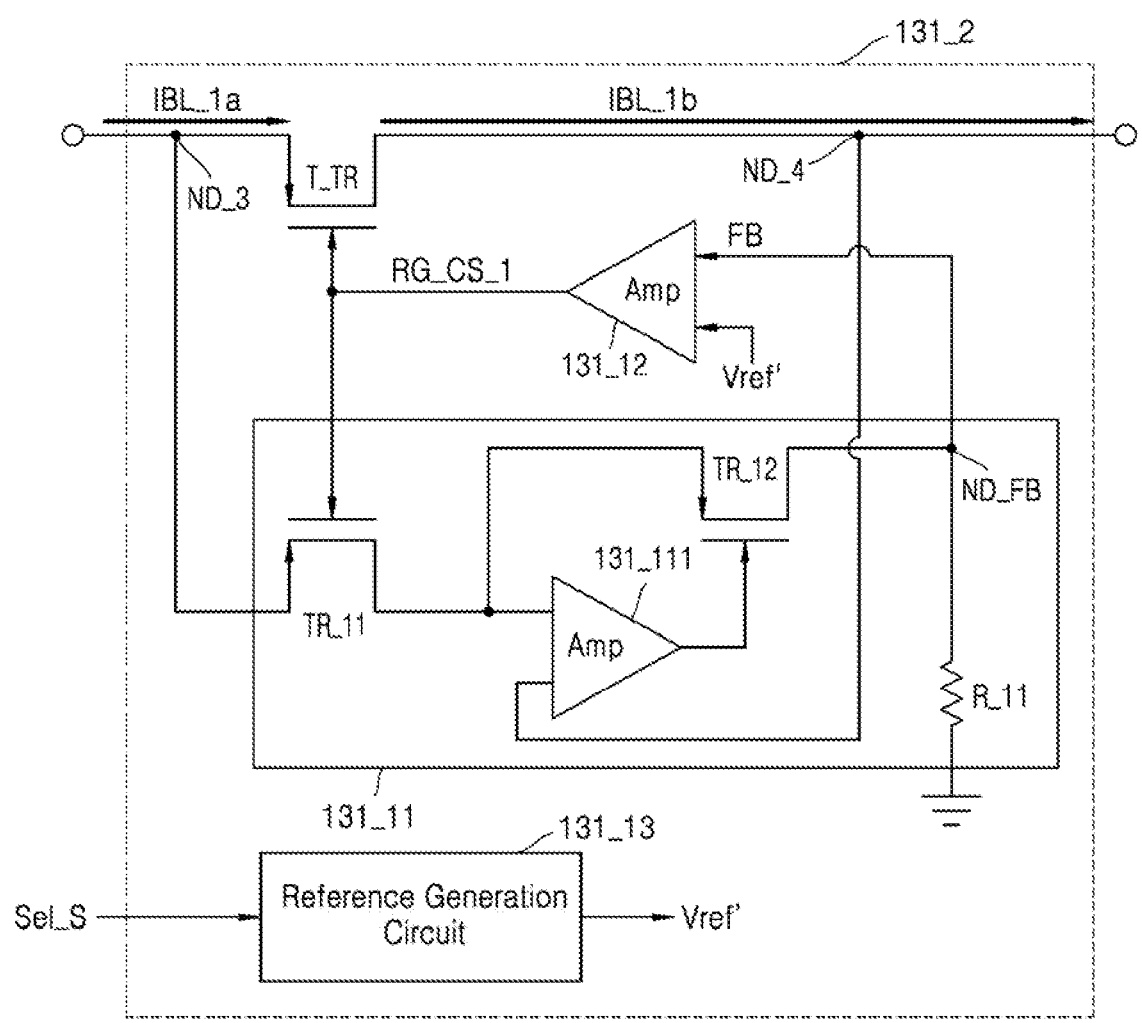

The first regulating circuit 131_1 of FIGS. 14A and 14B may regulate a balancing current according to the method shown in FIG. 11, and the first regulating circuit 131_2 of FIGS. 14C and 14D may regulate a balancing current according to the method shown in FIG. 12A or 12B.

Referring to FIG. 14A, the first regulating circuit 131_1 may include a transistor T_TR, a feedback generation circuit 131_11, and a first amplifier 131_12. The transistor T_TR may be a PMOS transistor. In an example embodiment, the transistor T_TR may include a source, which receives the first balancing current IBL_1a and is connected to the third node ND_3, a gate to which a first regulating control signal RG_CS_1 is applied, and a drain, which is connected to an anode of a first battery through the fourth node ND_4. However, this is merely an example embodiment, and example embodiments are not limited thereto. In an example embodiment, the transistor T_TR may be an NMOS transistor.

The feedback generation circuit 131_11 may be connected between the third node ND_3 and the fourth node ND_4 and generate a feedback FB corresponding to the regulated first balancing current IBL_1b. In an example embodiment, the feedback FB may be proportional to the regulated first balancing current IBL_1b. In an example embodiment, the feedback FB may be inversely proportional to the regulated first balancing current IBL_1b. Hereinafter, descriptions will be given under an assumption that the feedback FB is proportional to the regulated first balancing current IBL_1b.

The first amplifier 131_12 may receive the feedback FB and a reference voltage Vref respectively through an anode and a cathode, amplify a difference between the reference voltage Vref and the feedback FB, and output an amplified difference to the gate of the transistor T_TR as the first regulating control signal RG_CS_1. A circuit including the feedback generation circuit 131_11 and the first amplifier 131_12 may be referred to as a control circuit. The reference voltage Vref corresponds to the above-stated reference current. As the control circuit generates the first regulating control signal RG_CS_1 based on the reference voltage Vref and the feedback FB and provides the first regulating control signal RG_CS_1 to the gate of the transistor T_TR, the transistor T_TR may regulate the first balancing current IBL_1a. In an example embodiment, when the first balancing current IBL_1a exceeds the reference current, the transistor T_TR may regulate the first balancing current IBL_1a based on the first regulating control signal RG_CS_1 and provide the regulated first balancing current IBL_1b to the first battery. The resistance of the transistor T_TR may be regulated by the first regulating control signal RG_CS_1. Therefore, an operation for regulating the first balancing current IBL_1a may be referred to as an operation for regulating the resistance of the transistor T_TR.

However, this is merely an example embodiment, and example embodiments are not limited thereto. In an example embodiment, the first regulating circuit 131_1 may directly receive the first regulating control signal RG_CS_1 from an external device (e.g., an MCU). In an example embodiment, the MCU of an electronic device may sense a voltage of a first battery and a voltage of a second battery and calculate a voltage difference therebetween. Thereafter, the MCU may calculate a current first balancing current IBL_1a by dividing the reference loss by the voltage difference and, when the first balancing current IBL_1a exceeds the reference current, may generate the first regulating control signal RG_CS_1 for regulating the first balancing current IBL_1a to the reference current. Also, when the first balancing current is below or equal to the reference current, the MCU may generate the first regulating control signal RG_CS_1 for transferring the first balancing current IBL_a without regulation.

Referring to FIG. 14B, the feedback generation circuit 131_11 may include a second amplifier 131_111, a resistor R_11, a first transistor TR_11, and a second transistor TR_12. The first transistor TR_11 and the second transistor TR_12 may be PMOS transistors. In an example embodiment, the first transistor TR_11 may include a source connected to the third node ND_3, a gate to which the first regulating control signal RG_CS_1 is applied, and a drain connected to a cathode of the second amplifier 131_111 through a sensing node ND_S. The second transistor TR_12 may include a source connected to the cathode of the second amplifier 131_111 through the sensing node ND_S, the gate to which an output of the second amplifier 131_111 is applied, and a drain connected to an end of the resistor R_11 and the anode of the first amplifier 131_12 through a feedback node ND_FB. The second amplifier 131_111 may receive a voltage of the fourth node ND_4 corresponding to the voltage of the first battery and a voltage of the sensing node ND_S corresponding to a drain voltage of the first transistor TR_11 respectively through an anode and a cathode, and continuously apply an output to the gate of the second transistor TR_12, such that the voltage of the fourth node ND_4 and the voltage of the sensing node ND_S become equal to each other. As a result, a voltage applied to the resistor R_11, that is, a voltage of the feedback node ND_FB, may match the voltage of the fourth node ND_4, and the voltage of the feedback node ND_FB may be applied to the first amplifier 131_12 as the feedback FB. According to implementation examples of the feedback generation circuit 131_11, the feedback FB may be scaled to a low level compared to the voltage of the fourth node ND_4, thereby reducing power consumption and load at the first amplifier 131_12. However, this is merely an example embodiment, and example embodiments are not limited thereto. In an example embodiment, the first regulating circuit 131_1 may be implemented such that the voltage of the fourth node ND_4 is directly input to the anode of the first amplifier 131_12. Hereinafter, descriptions identical to those already given above with reference to FIG. 14A will be omitted.

Referring to FIG. 14C, the first regulating circuit 131_2 may further include a reference generating circuit 131_13 as compared to FIG. 14A, and a resistor R_11' may be a variable resistor whose resistance value is changed by a resistance value control signal R_cs. Also, a circuit including the feedback generation circuit 131_11, the first amplifier 131_12, and the reference generating circuit 131_13 may be referred to as a control circuit.

The reference generating circuit 131_13 may receive a selection signal Sel_S and generate the resistance value control signal R_cs for changing the resistance value of the resistor R_11' based on the selection signal Sel_S. In an example embodiment, the selection signal Sel_S may correspond to a temperature of an electronic device or a battery device to which example embodiments are applied. Therefore, the reference generating circuit 131_13 may control a degree of regulating the first balancing current IBL_1a by changing the resistance value of the resistor R_11' according to the temperature of the electronic device or the battery device.

In an example embodiment, the reference generating circuit 131_13 may regulate the resistance value of the resistor R_11' to have a first value based on a condition regarding the temperature of the electronic device or the battery device, such that the transistor T_TR regulates the first balancing current IBL_1a to the maximum reference current. The reference generating circuit 131_13 may regulate the resistance value of the resistor R_11' to have a second value based on a condition regarding the temperature of the electronic device or the battery device, such that the transistor T_TR regulates the first balancing current IBL_1a to the minimum reference current. However, this is merely an example embodiment, and example embodiments are not limited thereto. In an example embodiment, and the reference generating circuit 131_13 may variously regulate the first balancing current IBL_1a by variously changing the resistance value of the resistor R_11'. The reference generating circuit 131_13 may receive the selection signal Sel_S from an external device (e.g., MCU). In an example embodiment, the first regulating circuit 131_2 may also receive the first regulating control signal RG_CS_1 from an external device (e.g., an MCU). Hereinafter, descriptions identical to those already given above with reference to FIGS. 14A and 14B will be omitted.

Referring to FIG. 14D, the first regulating circuit 131_2 may further include the reference generating circuit 131_13 as compared to FIG. 14A.

The reference generating circuit 131_13 may receive the selection signal Sel_S, select any one of a plurality of voltages having different magnitudes based on the selection signal Sel_S, and provide a selected voltage to the first amplifier 131_12 as a reference voltage Vref. In an example embodiment, the selection signal Sel_S may correspond to a temperature of an electronic device or a battery device to which example embodiments are applied. Therefore, the reference generating circuit 131_13 may control a degree of regulating the first balancing current IBL_1a by changing the magnitude (or level) of the reference voltage Vref according to the temperature of the electronic device or the battery device. In an example embodiment, the reference generating circuit 131_13 may be implemented as a multiplexer. Hereinafter, descriptions identical to those already given above with reference to FIGS. 14A to 14C will be omitted.

Figure 15:
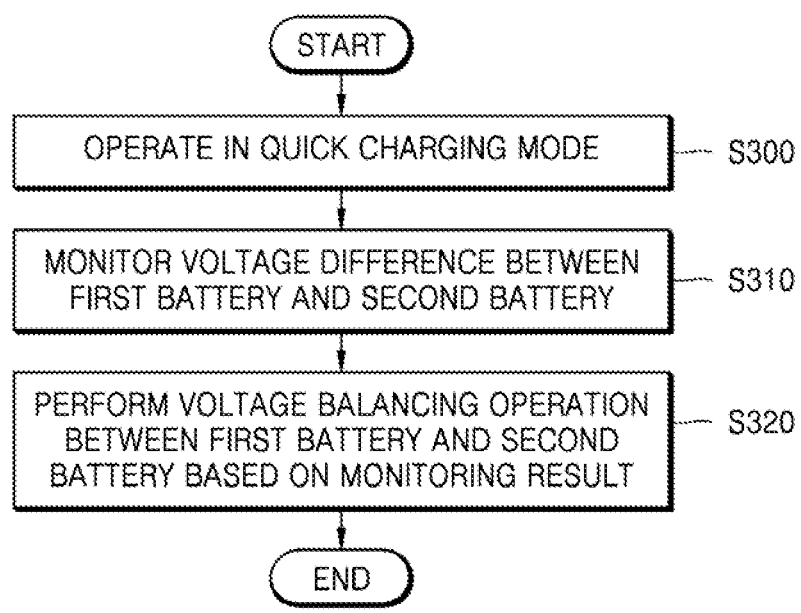
FIG. 15 is a flowchart of a balancing operation in a quick charging mode according to an example embodiment.

FIG. 15 is a flowchart of a balancing operation in a quick charging mode according to an example embodiment.

Referring to FIG. 15, in operation S300, a charging IC may operate in the quick charging mode. As described above, the charging IC may charge a first battery and a second battery connected to each other in series by using a direct charger.

In operation S310, the charging IC may monitor a difference between voltages of the first battery and the second battery. In an example embodiment, the difference between the voltages of the first battery and the second battery may be monitored by an MCU of an electronic device.

In operation S320, the charging IC may perform a balancing operation between the voltages of first battery and the second battery based on a monitoring result. In an example embodiment, when a difference between the voltages of the first battery and the second battery is equal to or greater than a reference value, the charging IC may perform a balancing operation after changing the connection between the first battery and the second battery. In an example embodiment, when there is a difference between the voltages of the first battery and the second battery, the charging IC may perform a balancing operation after changing the connection between the first battery and the second battery. In detail, the charging IC may perform a balancing operation after first battery and the second battery connected to each other in series are re-connected to each other in parallel. Detailed embodiments thereof will be described below with reference to FIGS. 16A to 17B.

Figure 16A:
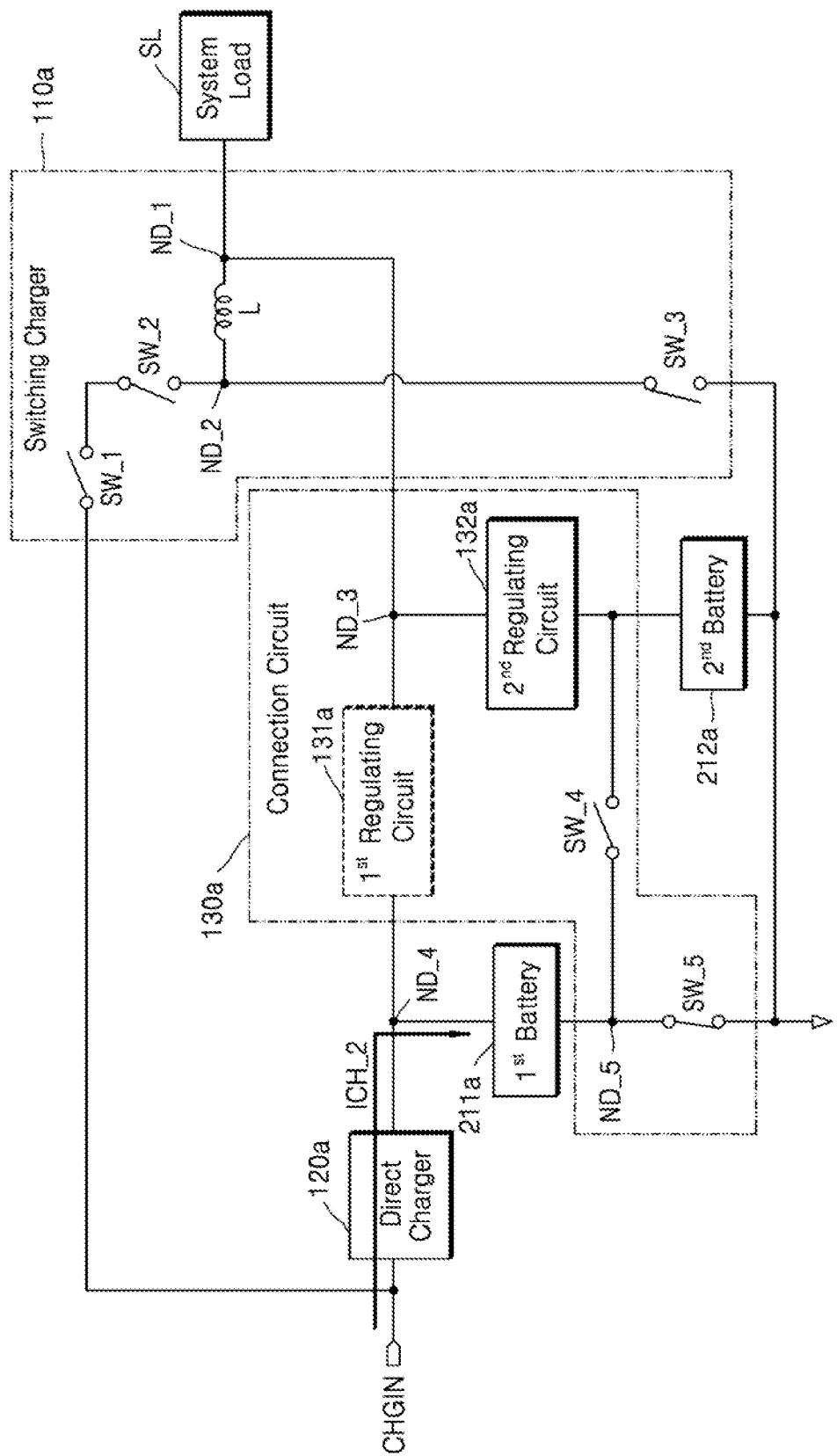
FIGS. 16A to 17B are diagrams for describing a balancing operation in a quick charging mode according to an example embodiment.
Figure 16B:
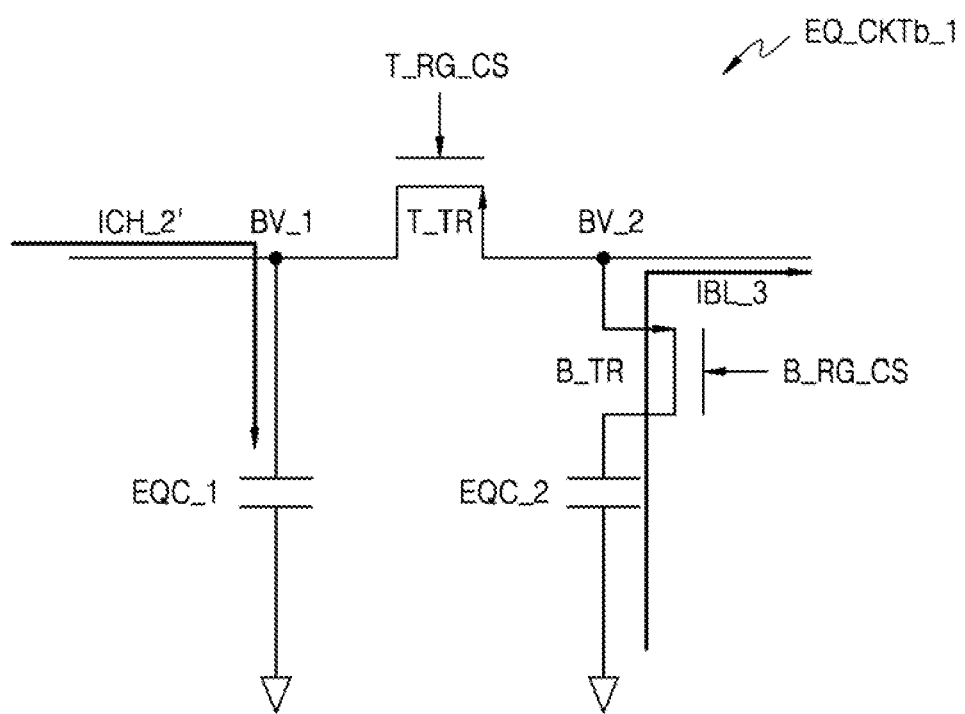
Figure 17A:
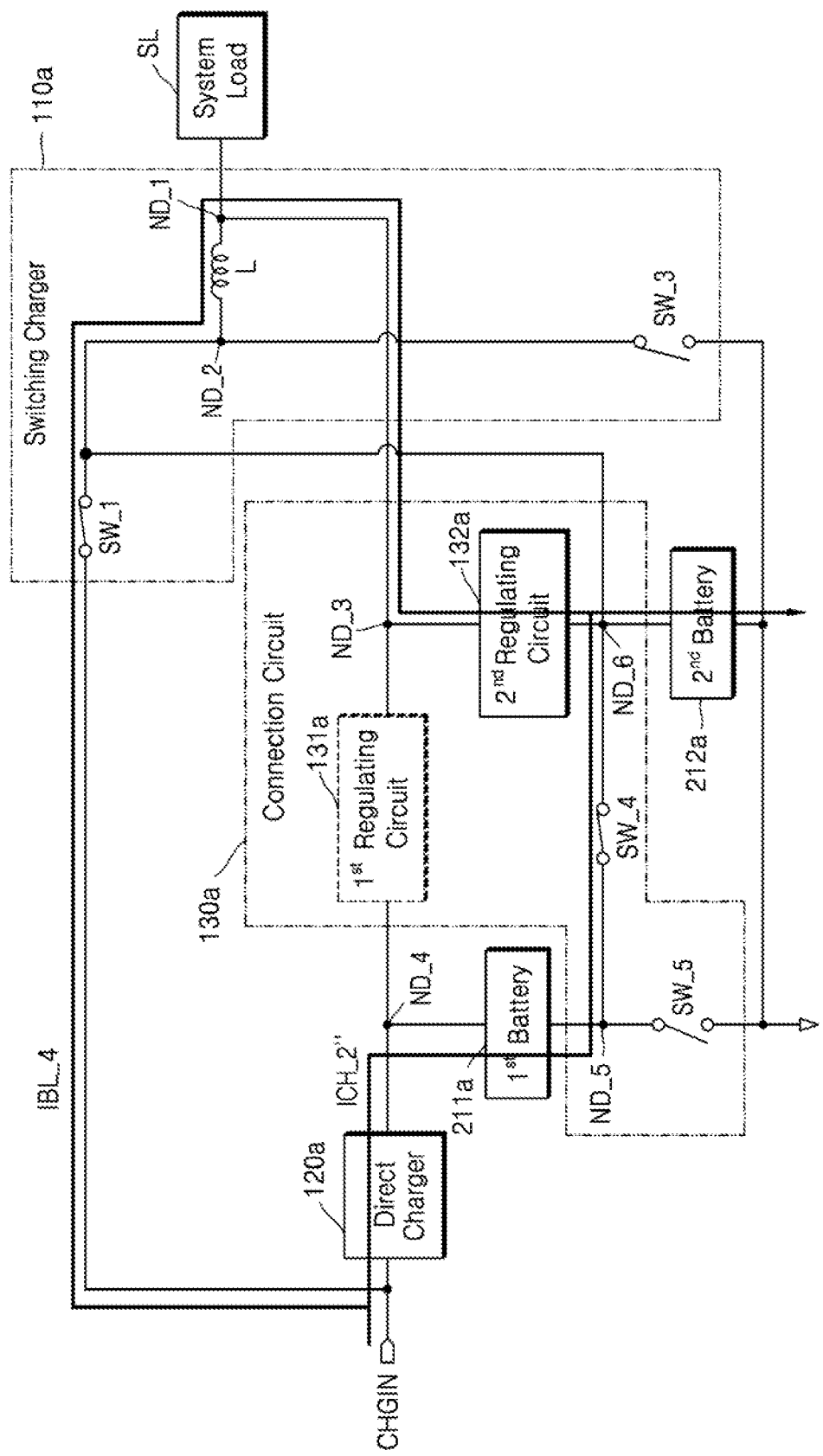
Figure 17B:
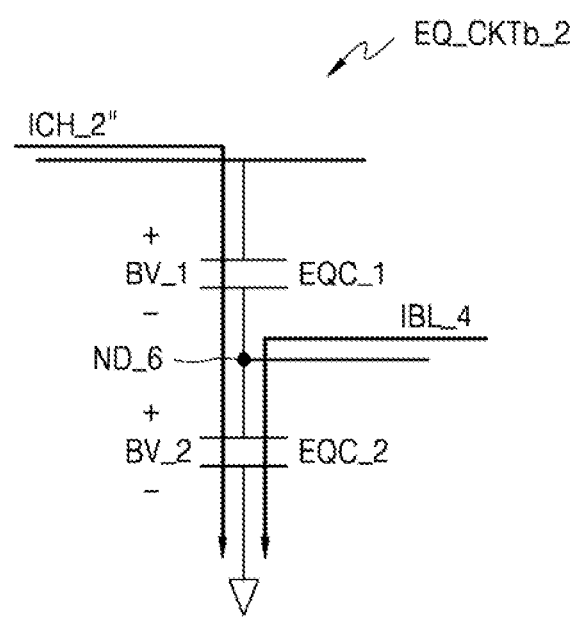

FIGS. 16A to 17B are diagrams for describing a balancing operation in a quick charging mode according to an example embodiment. FIGS. 16A and 16B show a case where the voltage of the second battery 212a is higher than the voltage of the first battery 211a, and FIGS. 17A and 17B show a case where the voltage of the first battery 211a is higher than the voltage of the second battery 212a.

Referring to FIG. 16A, the connection circuit 130a may control the first battery 211a and the second battery 212a connected to each other in series to be re-connected to each other in parallel. Thus, as compared to FIG. 5, the fourth switching element SW_4 may be turned off, and the fifth switching element SW_5 may be turned on. A detailed balancing operation in this case will be described with reference to an equivalent circuit EQ_CKTb_1 of FIG. 16B.

Referring to FIG. 16B, the first equivalent capacitor EQC_1 may correspond to the first battery 211a, the second equivalent capacitor EQC_2 may correspond to the second battery 212a, a transistor T_TR (which will be referred to as a top transistor in FIG. 16B) may correspond to the first regulating circuit 131a, and a bottom transistor B_TR may correspond to the second regulating circuit 132a. When the voltage BV_2 of the second equivalent capacitor EQC_2 is higher than the voltage BV_1 of the first equivalent capacitor EQC_1, the first equivalent capacitor EQC_1 may be charged by a complete second charging current ICH_2' and, as a current flows from the second equivalent capacitor EQC_2 to a system load (not shown), the first equivalent capacitor EQC_1 may be charged quicker than the second equivalent capacitor EQC_2. Therefore, the first equivalent capacitor EQC_1 may be voltage-balanced with the second equivalent capacitor EQC_2.

In an example embodiment, to regulate a third balancing current IBL_3, the bottom transistor B_TR may receive a bottom regulating control signal B_RG_CS, and the top transistor T_TR may receive a top regulating control signal T_RG_CS. In an example embodiment, the third balancing current IBL_3 may be properly regulated by the bottom transistor B_TR, which is semi-on by receiving the bottom regulating control signal B_RG_CS, and the top transistor T_TR, which is completely turned off by receiving the top regulating control signal T_RG_CS.

Referring to FIG. 17A, an electronic device 10c may include a connection between a sixth node ND_6 and a terminal of the first switch SW_1. As compared to FIG. 5, in the electronic device 10c, the first switching element SW_1 and the second switching element SW_2 may be turned on, and thus a balancing path for a fourth balancing current IBL_4 to be input to the second battery 212a may be formed. Meanwhile, in an example embodiment, the first regulating circuit 131a may be deactivated. A detailed balancing operation in this case will be described below with reference to an equivalent circuit EQ_CKTb_2 of FIG. 17B.

Referring to FIG. 17B, the first equivalent capacitor EQC_1 may correspond to the first battery 211a, and the second equivalent capacitor EQC_2 may correspond to the second battery 212a. When the voltage BV_1 of the first equivalent capacitor EQC_1 is higher than the voltage BV_2 of the second equivalent capacitor EQC_2, the fourth balancing current IBL_4 may be applied to the second equivalent capacitor EQC_2 through an additional current path formed in the switching charger 110a together with a second charging current ICH_2", and thus, the second equivalent capacitor EQC_2 may be charged quicker than the first equivalent capacitor EQC_1. Therefore, the second equivalent capacitor EQC_2 may be voltage-balanced with the first equivalent capacitor EQC_1.

Figure 18A:
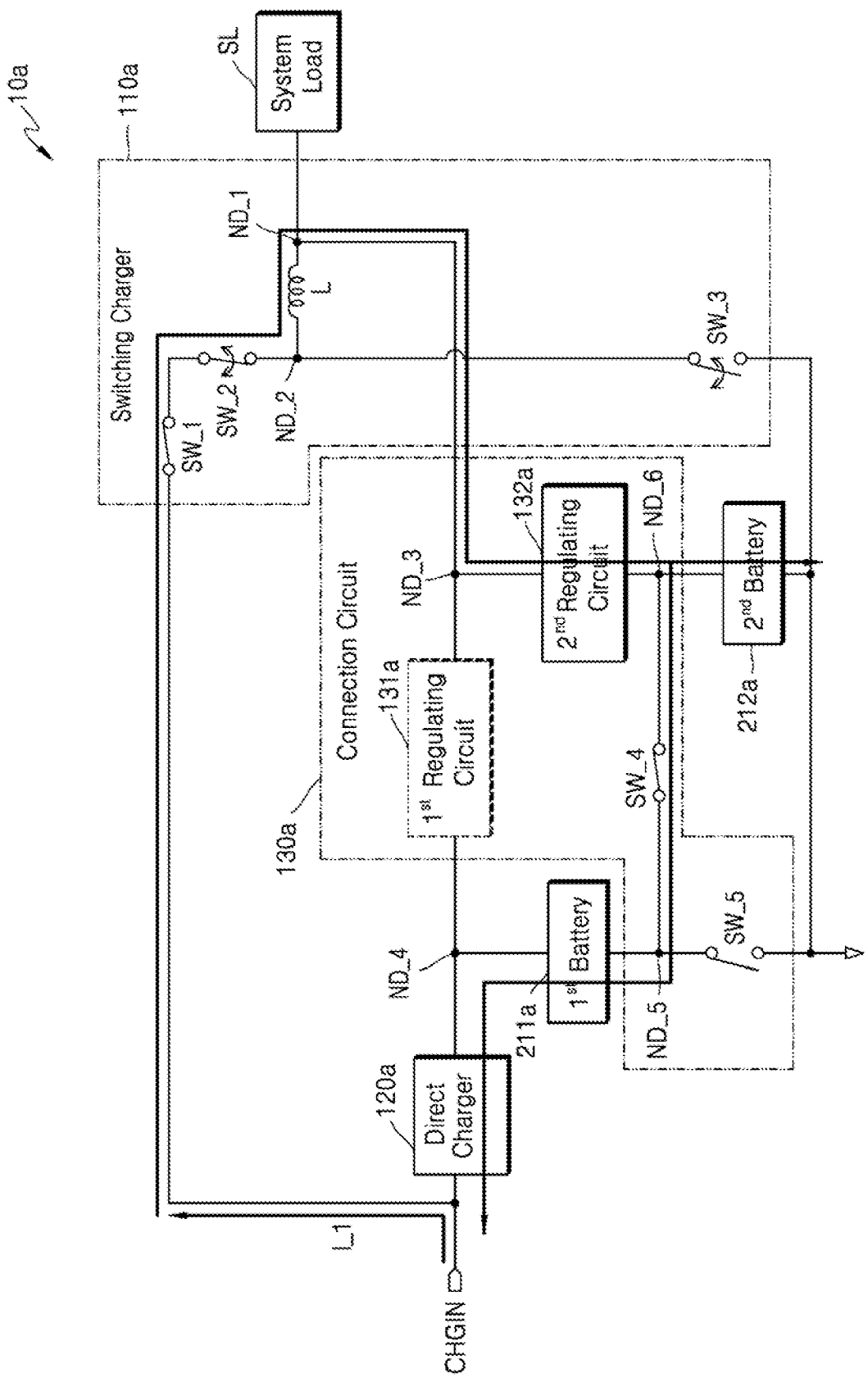
FIGS. 18A to 19B are diagrams for describing a method for improving a balancing speed in a balancing operation according to an example embodiment.
Figure 18B:
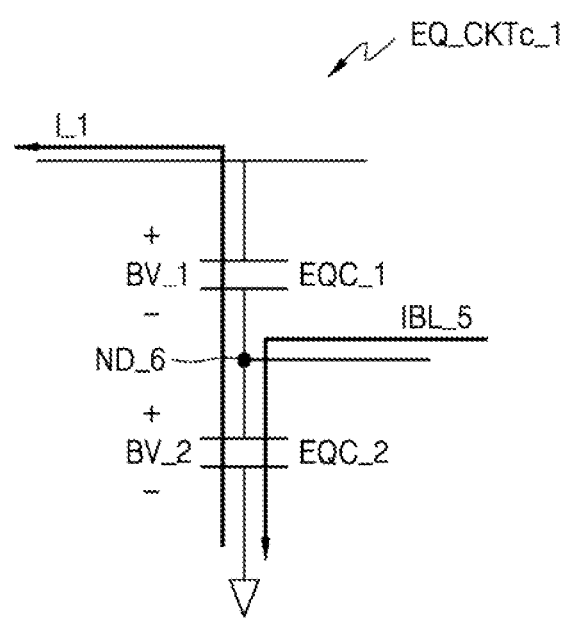
Figure 19A:
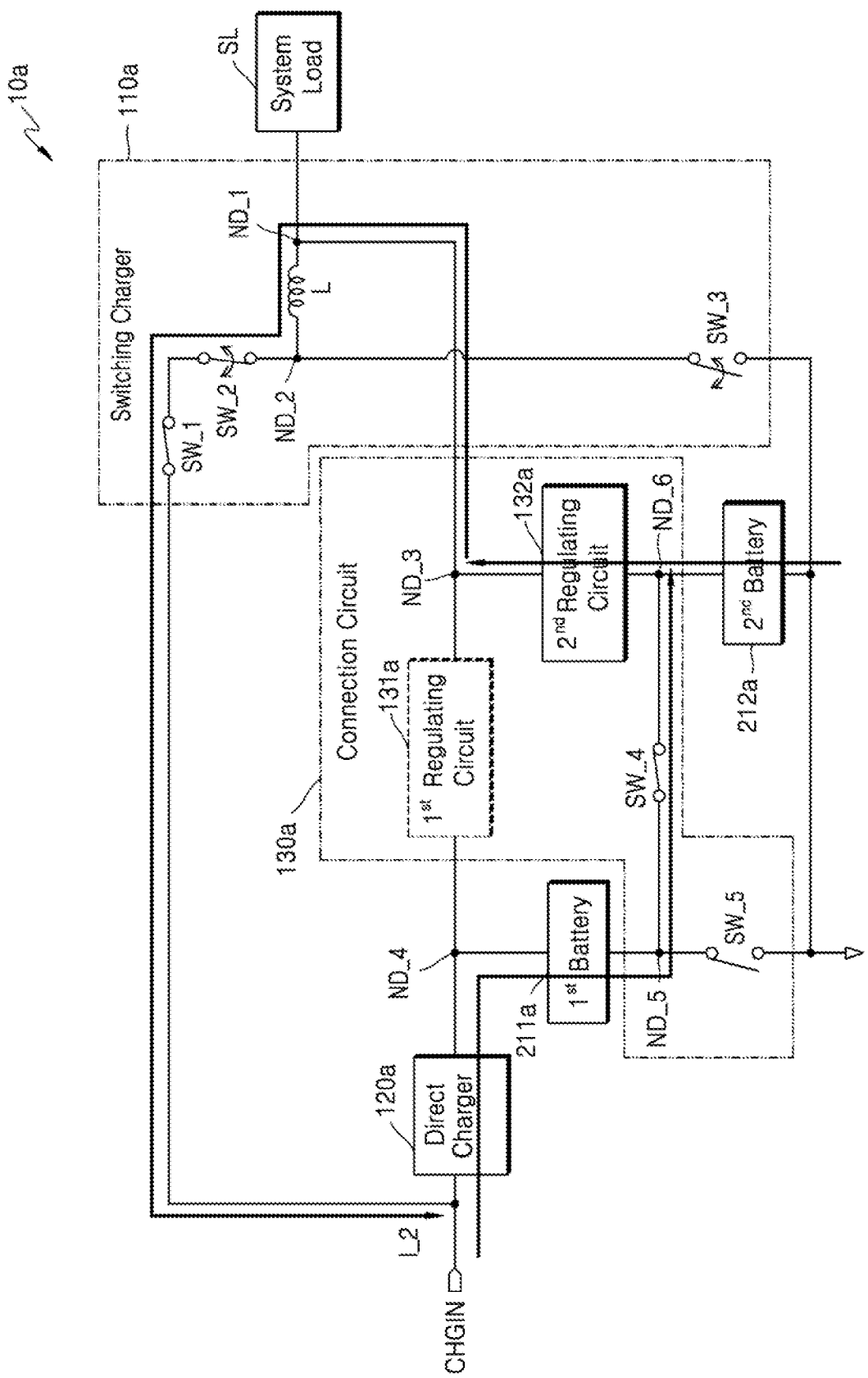
Figure 19B:
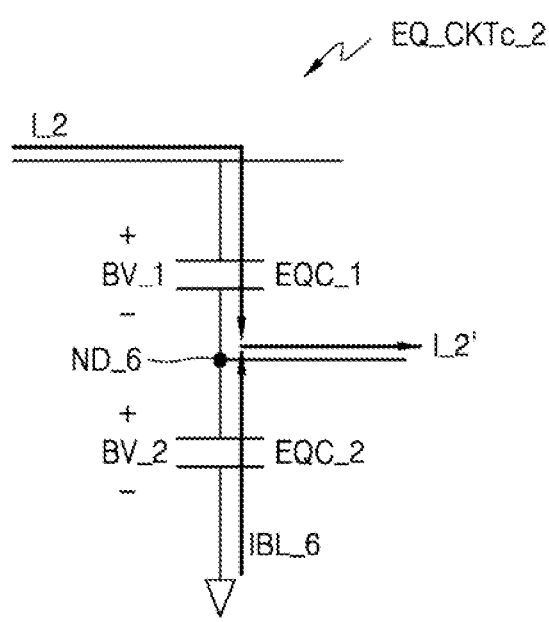

FIGS. 18A to 19B are diagrams for describing a method for improving a balancing speed in a balancing operation according to an example embodiment. FIGS. 18A and 16B show a case where the voltage of the first battery 211a is higher than the voltage of the second battery 212a, and FIGS. 19A and 19B show a case where the voltage of the second battery 212a is higher than the voltage of the first battery 211a.

Referring to FIG. 18A, both the switching charger 110a and the direct charger 120a may be activated and a current path through which a first current I_1 flows may be formed. The first battery 211a and the second battery 212a may be connected to each other in series as the fourth switching element SW_4 is turned on and the fifth switching element SW_5 is turned off. The switching charger 110a may operate in the buck mode, and the first current I_1 may be applied to the third node ND_3. A detailed balancing operation in this case will be described below with reference to an equivalent circuit EQ_CKTc_1 of FIG. 18B.

Referring to FIG. 18B, the first equivalent capacitor EQC_1 may correspond to the first battery 211a, and the second equivalent capacitor EQC_2 may correspond to the second battery 212a. When the voltage BV_1 of the first equivalent capacitor EQC_1 is higher than the voltage BV_2 of the second equivalent capacitor EQC_2, a fifth balancing current IBL_5 may flow from a positive terminal to a negative terminal and the first current I_1 flows from the negative terminal to the positive terminal in the second equivalent capacitor EQC_2, and thus a net current of the second equivalent capacitor EQC_2 may be approximately become 0. Meanwhile, since the first current I_1 flows from a negative terminal to a positive terminal in the first equivalent capacitor EQC_1, a net current of the first equivalent capacitor EQC_1 has a negative value. Therefore, the voltage BV_1 of the first equivalent capacitor EQC_1 may decrease and the voltage BV_2 of the second equivalent capacitor EQC_2 may be maintained, and thus, the voltage BV_1 and the voltage BV_2 may be balanced with respect to each other.

Referring to FIG. 19A, both the switching charger 110a and the direct charger 120a may be activated and a current path through which a second current I_2 flows may be formed. The first battery 211a and the second battery 212a may be connected to each other in series as the fourth switching element SW_4 is turned on and the fifth switching element SW_5 is turned off. Unlike in FIG. 18A, the switching charger 110a may operate in a boost mode, and the second current I_2 may be applied to the fourth node ND_4.

A detailed balancing operation in this case will be described below with reference to an equivalent circuit EQ_CKTc_1 of FIG. 19B.

Referring to FIG. 19B, the first equivalent capacitor EQC_1 may correspond to the first battery 211a, and the second equivalent capacitor EQC_2 may correspond to the second battery 212a. When the voltage BV_2 of the second equivalent capacitor EQC_2 is higher than the voltage BV_1 of the first equivalent capacitor EQC_1, the second current I_2 flows from the positive terminal to the negative terminal in the first equivalent capacitor EQC_1, and thus, the net current of the first equivalent capacitor EQC_1 has a positive value. Meanwhile, a sixth balancing current IBL_6 flows from the negative terminal to the positive terminal in the second equivalent capacitor EQC_2, the net current of the second equivalent capacitor EQC_2 has a negative value. Therefore, the voltage BV_1 of the first equivalent capacitor EQC_1 may increase and the voltage BV_2 of the second equivalent capacitor EQC_2 may decrease, and thus, the voltage BV_1 and the voltage BV_2 may be balanced with respect to each other. Meanwhile, a current I_2', which is a combination of the second current I_2 and the sixth balancing current IBL_6, may be output from an equivalent circuit EQ_CKTc_2.

Meanwhile, flows of currents shown in FIGS. 18A to 19B schematically show only currents used to describe the embodiments, and example embodiments are not limited thereto. In an example embodiment, both the switching charger 110a and the direct charger 120a may be activated and various currents for balancing voltages of the first battery 211a and the second battery 212a may be additionally generated.

Figure 20:
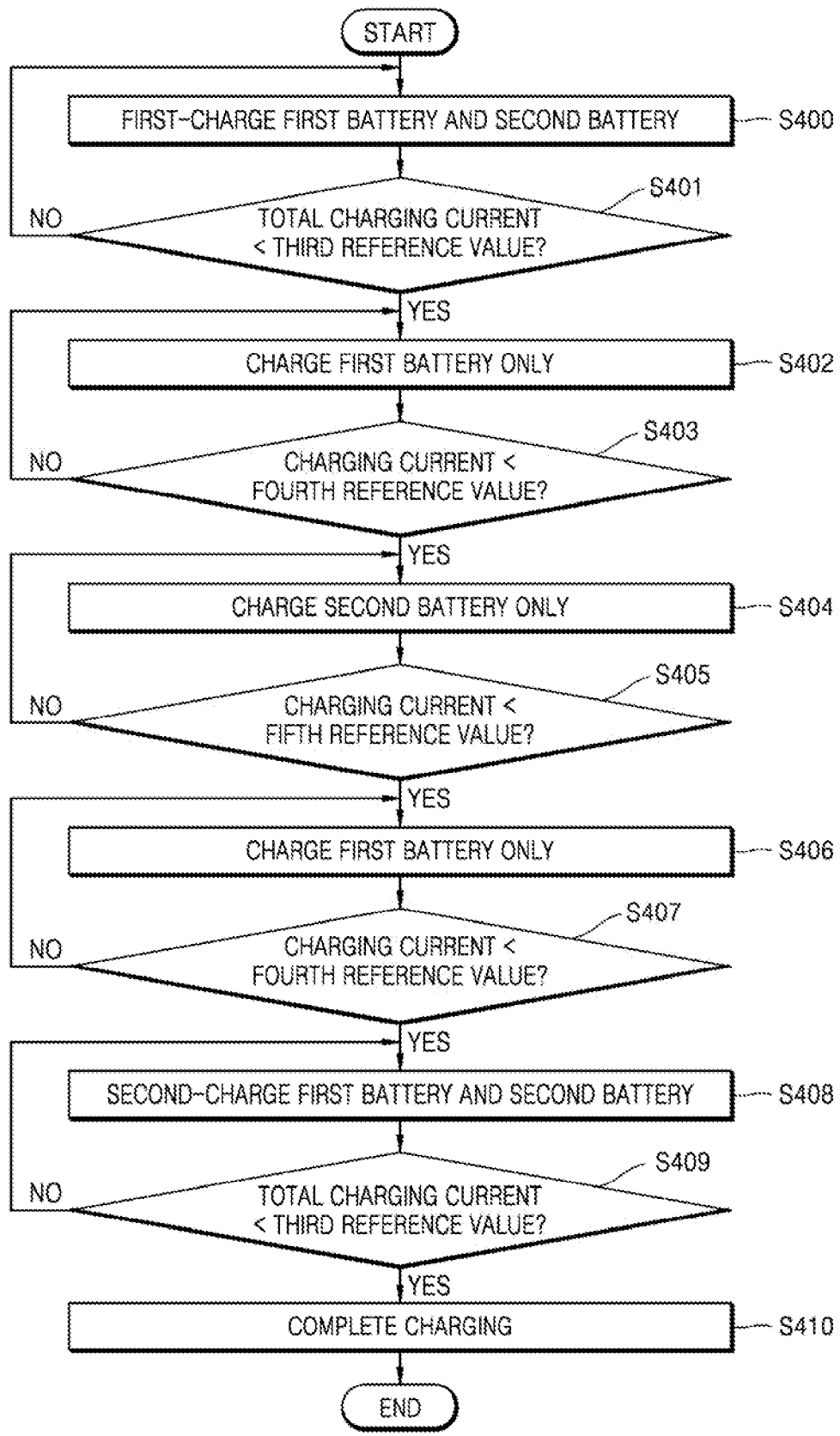
FIG. 20 is a flowchart of a method of determining whether a battery device including a first battery and a second battery is completely charged, according to an example embodiment.

FIG. 20 is a flowchart of a method of determining whether a battery device including a first battery and a second battery is completely charged according to an example embodiment.

Referring to FIG. 20, in operation S400, a charging IC may first-charge the first battery and the second battery. The first-charging may include pre-charging, CC-based charging, and CV-based charging for first battery and the second battery.

Thereafter, in operation S401, the charging IC may determine whether a total charging current flowing through the first battery and the second battery is below a third reference value. When a result of the determination in operation S401 is 'YES', in subsequent operation S402, the charging IC may charge only the first battery. In this case, for example, charging for the first battery may correspond to CV-based charging. When the result of the determination in operation S401 is 'NO', operation S400 may be continued.

In operation S403, the charging IC may determine whether a charging current for the first battery is below a fourth reference value. When a result of the determination in operation S403 is 'YES', in subsequent operation S404, the charging IC may charge only the second battery. In this case, for example, charging for the second battery may correspond to CV-based charging. When the result of the determination in operation S403 is 'NO', operation S402 may be continued.

In operation S405, the charging IC may determine whether a charging current for the second battery is below a fifth reference value. When a result of the determination in operation S405 is 'YES', in subsequent operation S406, the charging IC may charge only the first battery again. In this case, for example, charging for the first battery may correspond to CV-based charging. When the result of the determination in operation S405 is 'NO', operation S404 may be continued.

In operation S407, the charging IC may determine whether a charging current for the first battery is below the fourth reference value. When a result of the determination in operation S407 is 'YES', in subsequent operation S408, the charging IC may charge the first battery and the second battery. In this case, for example, charging for the first battery and the second battery may correspond to CV-based charging. When the result of the determination in operation S407 is 'NO', operation S406 may be continued.

In operation S409, the charging IC may determine whether a total charging current regarding the first battery and the second battery is below the third reference value. When a result of the determination in operation S409 is 'YES', in subsequent operation S410, the charging IC may complete charging of the first battery and the second battery. When the result of the determination in operation S409 is 'NO', operation S408 may be continued.

Meanwhile, the third to fifth reference values may be different from one another or the same and may be set in advance.

Figure 21:
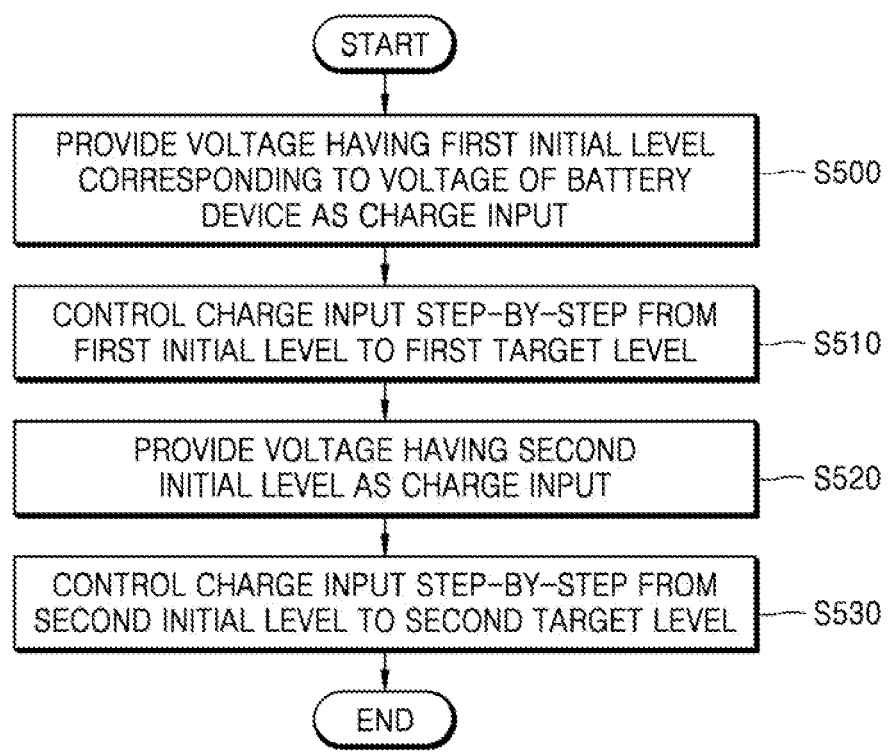
FIG. 21 is a flowchart of a method of controlling a charge input during a charging operation, according to an example embodiment.

FIG. 21 is a flowchart of a method of controlling a charge input during a charging operation, according to an example embodiment.

Referring to FIG. 21, in operation S500, a power delivery unit may communicate with a charging IC and provide a voltage having a first initial level corresponding to the voltage of a battery device connected to the charging IC as a charge input. In an example embodiment, the power delivery unit may correspond to the TA described above in connection with FIG. 1.

In operation S510, the power delivery unit may continuously communicate with the charging IC and gradually control the charge input from the first initial level to a first target level. In operation S500 and operation S510, a charging operation in a CC period may be performed.

In operation S520, the power delivery unit may communicate with the charging IC and provide a current having a second initial level as a charge input.

In operation S530, the power delivery unit may continuously communicate with the charging IC and gradually control the charge input from the second initial level to a second target level. In operation S520 and operation S530, a charging operation in a CV period may be performed.

Figure 22:
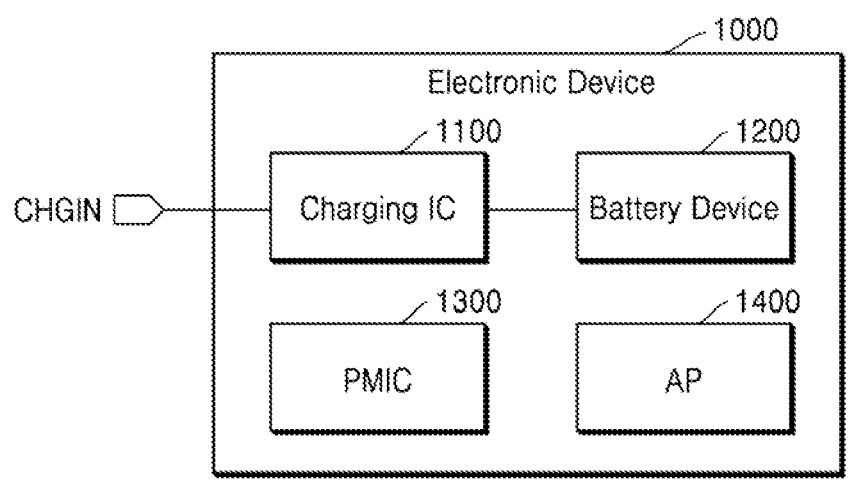
FIG. 22 is a block diagram of an electronic device according to an example embodiment.

FIG. 22 is a block diagram of an electronic device 1000 according to an example embodiment.

Referring to FIG. 22, the electronic device 1000 may include a charging IC 1100, a battery device 1200, a PMIC 1300, and an application processor 1400. The electronic device 1000 may include the charging IC 1100 for receiving power from an external source and charging the battery device 1200. The charging IC 1100 may be implemented according to various embodiments shown in FIGS. 1 to 21.

The PMIC 1300 may receive a battery voltage and manage power used for driving the application processor 1400. The PMIC 300 may be implemented to generate or manage voltages used for internal components of the electronic device 1000. According to embodiments, the electronic device 1000 may include a plurality of PMICs including the PMIC 1300. In an embodiment, the PMIC 1300 may receive a battery voltage from the battery device 1200. In an embodiment, the PMIC 1300 may receive a system voltage through the charging IC 1100. In an embodiment, the PMIC 1300 may also directly receive the charge input CHGIN.

The application processor 1400 may control the electronic device 1000 overall. In an example embodiment, the application processor 1400 may control the charging IC 1100. In an example embodiment, the application processor 1400 may control the charging IC 1100 to be in the first charging mode, the second charging mode, or the battery-only mode. In an embodiment, when the electronic device 1000 is connected to a TA, the application processor 1400 may communicate with the TA and regulate the charge input CHGIN output from the TA. In an example embodiment, the application processor 1400 may be implemented as a system-on-chip including one or more intellectual properties (IP).

As described above, embodiments may provide a charging integrated circuit (IC) capable of supporting various charging modes for a battery device and preventing flow of a high current that may damage a plurality of batteries, thereby stably supplying system power by using the battery device. Embodiments may also provide an electronic device including the charging IC.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A charging integrated circuit (IC) for charging a battery device that includes a first battery and a second battery, the charging IC comprising:
   a connection circuit configured to selectively connect the first battery and the second battery to each other in series and in parallel;
   a first charger configured to charge the first battery and the second battery connected to each other in parallel in a first charging mode; and
   a second charger configured to charge the first battery and the second battery connected to each other in series in a second charging mode,
   wherein the connection circuit includes:
      a first regulating circuit connected to the first battery in series and configured to regulate a first balancing current flowing to the first battery; and
      a second regulating circuit connected to the second battery in series and configured to regulate a second balancing current flowing to the second battery.

2. The charging IC as claimed in claim 1, wherein: the first charger is configured to provide a first charging current to a node between the first regulating circuit and the second regulating circuit, and
   the second charger is configured to provide a second charging current to a high voltage terminal of the battery device connected to one end of the first battery.

3. The charging IC as claimed in claim 1, wherein: the first balancing current occurs when a voltage of the first battery is lower than a voltage of the second battery, and
   the second balancing current occurs when the voltage of the second battery is lower than the voltage of the first battery.

4. The charging IC as claimed in claim 1, wherein: the connection circuit is configured such that the first battery and the second battery are connected to each other in parallel in a battery-only mode, and
   the first regulating circuit and the second regulating circuit are configured to monitor the first balancing current and the second balancing current, and regulate the first balancing current and the second balancing current based on monitoring results, respectively.

5. The charging IC as claimed in claim 4, wherein: the first regulating circuit includes:
      a first control circuit configured to compare the first balancing current with a reference current, and generate a first regulating control signal based on a result of the comparison; and
      a first transistor configured to regulate the first balancing current based on the first regulating control signal, which is received through a first gate terminal of the first transistor, and
   the second regulating circuit includes:
      a second control circuit configured to compare the second balancing current with the reference current, and generate a second regulating control signal based on a result of the comparison; and
      a second transistor configured to regulate the second balancing current based on the second regulating control signal, which is received through a second gate terminal of the second transistor.

6. The charging IC as claimed in claim 5, wherein: the first transistor is configured to output the first balancing current regulated to be below or equal to the reference current to the first battery, in response to the first regulating control signal, and
   the second transistor is configured to output the second balancing current regulated to be below or equal to the reference current to the second battery, in response to the second regulating control signal.

7. The charging IC as claimed in claim 5, wherein the reference current is determined based on a pre-set reference loss.

8. The charging IC as claimed in claim 1, wherein: the connection circuit is configured such that the first battery and the second battery are connected to each other in parallel in a battery-only mode, and
   the first regulating circuit and the second regulating circuit are configured to regulate the first balancing current and the second balancing current based on a temperature of the battery device.

9. The charging IC as claimed in claim 8, wherein: the first regulating circuit is configured to regulate the first balancing current to any one of a maximum reference current and a minimum reference current based on the temperature of the battery device, and
   the second regulating circuit is configured to regulate the second balancing current to any one of the maximum reference current and the minimum reference current based on the temperature of the battery device.

10. The charging IC as claimed in claim 8, wherein: the first regulating circuit is configured to regulate the first balancing current into pulses having a variable duty ratio, a maximum reference current, and a minimum reference current according to the temperature of the battery device, and
    the second regulating circuit is configured to regulate the second balancing current into pulses having the variable duty ratio, the maximum reference current, and the minimum reference current according to the temperature of the battery device.

11. The charging IC as claimed in claim 1, wherein the charging IC is configured to perform a voltage balancing operation between the first battery and the second battery when a difference between a voltage of the first battery and a voltage of the second battery is equal to or greater than a reference value, in the first charging mode.

12. The charging IC as claimed in claim 11, wherein, in the first charging mode, when the voltage of the first battery is lower than the voltage of the second battery by as much as the reference value,
the connection circuit is configured to connect the first battery and the second battery to each other in parallel to form a path for a third balancing current, which flows from the second battery to the first battery through the second regulating circuit and the first regulating circuit.

13. The charging IC as claimed in claim 11, wherein, in the first charging mode, when the voltage of the second battery is lower than the voltage of the first battery by as much as the reference value,
the first charger is configured to form a path for charging the first battery and the second battery in the first charging mode as a path of a fourth balancing current flowing to the second battery.

14. The charging IC as claimed in claim 1, wherein:
the first charging mode corresponds to a normal charging mode and the second charger is deactivated in the first charging mode, and
the second charging mode corresponds to a quick charging mode and the first charger is deactivated in the second charging mode.

15. The charging IC as claimed in claim 1, wherein the first charger includes a switching charger that includes:
first, second, and third switching elements connected in series between an input terminal receiving a charge input and a ground;
an inductor element connected between a switching node, which is between the second switching element and the third switching element, and a first output node; and
a fourth switching element connected between the first output node and a second output node, wherein:
the first output node is configured to be connected to a system load, and
the second output node is connected to a node between the first regulating circuit and the second regulating circuit.

16. The charging IC as claimed in claim 1, wherein the second charger includes a direct charger that includes at least one switching element connected between a high voltage terminal of the battery device, which is connected to one end of the first battery, and an input terminal that is configured to receive a charge input.

17. The charging IC as claimed in claim 1, further comprising a control logic configured to control at least one of the first charger, the second charger, and the connection circuit.

18. An electronic device, comprising:
the charging IC as claimed in claim 1;
the battery device including the first battery and the second battery; and
a system load configured to receive power from the charging IC,
wherein:
the first charger is connected to the system load, and is configured to charge the first battery and the second battery connected to each other in parallel in the first charging mode through a first charging path, and
the second charger is configured to charge the first battery and the second battery connected to each other in series in the second charging mode through a second charging path.

19. A charging integrated circuit (IC) for charging a first battery and a second battery, the charging IC comprising:
a switching charger configured to charge the first battery and the second battery using a first charge input received from a first input terminal in a normal charging mode;
a direct charger configured to charge the first battery and the second battery using a second charge input received from a second input terminal in a quick charging mode; and
a connection circuit configured to connect the first battery and the second battery to each other in series or in parallel, the connection circuit including:
a first switching element and a second switching element configured to connect the first battery and the second battery to each other in series or in parallel;
a first regulating circuit configured to regulate a first balancing current flowing to the first battery; and
a second regulating circuit configured to regulate a second balancing current flowing to the second battery.

20. An integrated circuit (IC) for charging a first battery and a second battery, the IC comprising:
a connection circuit configured to connect the first battery and the second battery to each other in parallel in a first charging mode, and connect the first battery and the second battery to each other in series in a second charging mode, the connection circuit including:
a first regulating circuit connected to the first battery in series and configured to regulate a first balancing current flowing to the first battery; and
a second regulating circuit connected to the second battery in series and configured to regulate a second balancing current flowing to the second battery.

* * * * *